US009796107B2

(12) United States Patent
Bailey et al.

(10) Patent No.: US 9,796,107 B2
(45) Date of Patent: *Oct. 24, 2017

(54) WOOD-BASED COMPOSITE PANEL WITH REDUCED TOP SURFACE EDGE FLARE

(75) Inventors: Stephen B. Bailey, Lufkin, TX (US); Michael C. Schoneberger, Bemidji, MN (US)

(73) Assignee: Norbord Inc., Ontario (CA)

( * ) Notice: Subject to any disclaimer, the term of this patent is extended or adjusted under 35 U.S.C. 154(b) by 616 days.

This patent is subject to a terminal disclaimer.

(21) Appl. No.: 13/196,036

(22) Filed: Aug. 2, 2011

(65) Prior Publication Data

US 2011/0287211 A1 Nov. 24, 2011

Related U.S. Application Data

(63) Continuation of application No. 12/651,637, filed on Jan. 4, 2010, now Pat. No. 8,015,709, which is a continuation of application No. 10/941,644, filed on Sep. 15, 2004, now Pat. No. 7,640,664.

(60) Provisional application No. 60/503,243, filed on Sep. 15, 2003.

(51) Int. Cl.

*B32B 3/06* (2006.01)
*B32B 3/00* (2006.01)
*B27N 3/04* (2006.01)

(52) U.S. Cl.

CPC ........... *B27N 3/04* (2013.01); *Y10T 29/49629* (2015.01); *Y10T 428/24008* (2015.01); *Y10T 428/24612* (2015.01)

(58) Field of Classification Search

CPC ............ A44B 18/0011; A44B 18/0076; A47B 95/043; A61F 13/62; B32B 27/12; B32B 3/30; B32B 27/08; B31F 1/07; B31F 22/01; G02B 5/124

USPC .................................................... 428/99, 172

See application file for complete search history.

(56) References Cited

U.S. PATENT DOCUMENTS

| | | | | |
|---|---|---|---|---|
| 3,987,599 | A | 10/1976 | Hines | |
| 4,969,302 | A | 11/1990 | Coggan et al. | |
| 5,113,632 | A * | 5/1992 | Hanson | 52/385 |
| 5,640,812 | A * | 6/1997 | Crowley et al. | 52/90.1 |
| 6,497,937 | B1 | 12/2002 | Lam et al. | |
| 6,608,131 | B1 | 8/2003 | Winterowd et al. | |
| 6,675,544 | B1 * | 1/2004 | Ou et al. | 52/539 |
| 6,800,352 | B1 | 10/2004 | Hejna et al. | |
| 7,264,796 | B2 | 9/2007 | Hejna et al. | |
| 7,640,664 | B1 | 1/2010 | Bailey et al. | |
| 8,015,709 | B1 | 9/2011 | Bailey et al. | |
| 2003/0024199 | A1 * | 2/2003 | Pervan et al. | 52/589.1 |
| 2004/0251446 | A1 | 12/2004 | Mantanis | |
| 2004/0255541 | A1 * | 12/2004 | Thiers et al. | 52/578 |

OTHER PUBLICATIONS

"U.S. Appl. No. 10/941,644, Final Office Action dated Mar. 31, 2008", FOAR, 3pgs.

(Continued)

*Primary Examiner* — Tahseen N Khan

(74) *Attorney, Agent, or Firm* — Schwegman Lundberg & Woessner, P.A.

(57) ABSTRACT

The present invention provides a wood-based composite panel that is not susceptible to top surface edge swell, and methods of making the panel.

20 Claims, 12 Drawing Sheets

(56) References Cited

OTHER PUBLICATIONS

"U.S. Appl. No. 10/941,644, Non-Final Office Action dated Nov. 26, 2008", 12 Pgs.
"U.S. Appl. No. 10/941,644, Notice of Allowance dated Sep. 21, 2009", 2 Pgs.
"U.S. Appl. No. 10/941,644, Preliminary Amendment dated Jun. 9, 2005", 14 pgs.
"U.S. Appl. No. 10/941,644, Response dated Jan. 7, 2008 to Non-Final Office Action dated Oct. 5, 2007", 21 pgs.
"U.S. Appl. No. 10/941,644, Response dated May 26, 2009 to Non Final Office Action dated Nov. 26, 2008", 17 pgs.
"U.S. Appl. No. 10/941,644, Response dated Jul. 13, 2007 to Restriction Requirement dated Jun. 13, 2007", 15 pgs.
"U.S. Appl. No. 10/941,644, Response dated Sep. 29, 2008 to Final Office Action dated Mar. 31, 2008", 15 pgs.
"U.S. Appl. No. 10/941,644, Restriction Requirement dated Jun. 13, 2007", 5 pgs.
"U.S. Appl. No. 12/651,637, Non Final Ofice Action dated Dec. 27, 2010", 6 pgs.
"U.S. Appl. No. 12/651,637, Notice of Allowance dated Jun. 8, 2011", 5 pgs.
"U.S. Appl. No. 12/651,637, Response dated Mar. 25, 2011 to Non Final Office Action dated Dec. 27, 2010", 18 pgs.
"Non-Final Office Action dated Oct. 5, 2007 in U.S. Appl. No. 10/941,644", OARN, 3 pgs.

* cited by examiner

WOOD-BASED COMPOSITE PANEL WITH REDUCED TOP SURFACE EDGE FLARE

CLAIM OF PRIORITY

This application is a continuation of and claims the benefit of priority under 35 U.S.C. §120 to U.S. patent application Ser. No. 12/651,637, filed on Jan. 4, 2010, and now issued as U.S. Pat. No. 8,015,709, which is a continuation and claims the benefit of priority under 35 U.S.C. §120 to U.S. patent application Ser. No. 10/941,644, filed on Sep. 15, 2004, and now issued as U.S. Pat. No. 7,640,664, which claims the benefit under 35 U.S.C. §119(e) to U.S. Application No. 60/503,243 filed on Sep. 15, 2003, the benefit of priority of each of which is claimed hereby, and each of which are incorporated by reference herein in its entirety.

BACKGROUND OF THE INVENTION

Oriented Strand Board (OSB) is an engineered structural-use panel typically manufactured from thin wood strands bonded together with resin under heat and pressure, and it is used extensively for roof, wall, and floor sheathing in residential and commercial construction.

One drawback associated with known oriented strand boards (OSB) is that they are susceptible to edge swell or flare due to moisture absorption. In fact, the largest detractor to OSB flooring is the need to sand tongue and groove joints due to flare (swell) due to moisture during construction. Upon swelling, the top surface of the OSB panel will necessitate sanding, especially when used in flooring applications. This is not only time-consuming, but is also an added expense. Currently, edge swell or flare due to moisture absorption is addressed with increased amounts of phenol-formaldehyde (PF) resin, isocyanate resin and/or increased density (i.e., additional wood). These are all added expenses that must be born by the consumer.

There is a need for a wood-based composite panel (e.g., OSB) that is not susceptible to top surface edge swell or flare due to moisture absorption above the plane of the top surface of the panel.

SUMMARY OF THE INVENTION

The present invention provides a wood-based composite panel that is not susceptible to top surface edge swell or flare due to moisture absorption above the plane of the top surface of the panel. Upon swelling, the top surface of the panel of the present invention will not require sanding, even when used in flooring applications. The use of such panel will save time and money during construction. The manufacturing of such panel will obviate the need for increased amounts of phenol-formaldehyde (PF) resin, isocyanate resin and/or increased density (i.e., additional wood), which typically add to the overall expense of the panel.

The present invention provides a wood-based composite panel that is not susceptible to top surface edge swell. The panel includes: a top surface having four opposing sides that define a perimeter; and a bottom surface opposite the top surface having four opposing sides that define a perimeter; the top and bottom surfaces forming a non-uniform width, such that the width along at least one of the four opposing sides of the oppositely facing top and bottom surfaces is less than the thickness of the remaining portions of the panel.

The present invention also provides a wood-based composite panel that is not susceptible to top surface edge swell, the panel prepared by the process that includes: (i) contacting flakes of wood with a first resin, such that the first resin is located on at least a portion of the surface of the flakes of wood; (ii) forming a blanket of substantially oriented flakes; (iii) curing the first resin by exposing the first resin to at least one of an elevated temperature, an elevated pressure, and radiant energy; for a sufficient period of time; to effectively cure the first resin; thereby effectively providing a wood-based composite panel; and (iv) removing a portion of the panel, thereby providing a panel having a non-uniform width such that the width along at least one of the outer sides of the oppositely facing top and bottom surfaces is less than the width of the remaining portions of the panel.

The present invention also provides a wood-based composite panel that is not susceptible to top surface edge swell. The panel is prepared by the process that includes: (i) contacting veneers of wood with a first resin, such that the first resin is located on at least a portion of the surface of the veneers of wood; (ii) forming a stack of alternating oriented veneers; (iii) curing the first resin by exposing the first resin to at least one of an elevated temperature, an elevated pressure, and radiant energy; for a sufficient period of time; to effectively cure the first resin; thereby effectively providing a wood-based composite panel; and (iv) removing a portion of the panel, thereby providing a panel having a non-uniform width such that the width along at least one of the outer sides of the oppositely facing top and bottom surfaces is less than the width of the remaining portions of the panel.

The present invention also provides a process for manufacturing a wood-based composite panel that is not susceptible to top surface edge swell, the process includes: (i) contacting flakes of wood with a first resin; (ii) orienting, in substantially alternate lengthwise and crosswise layers, the flakes of wood to provide a blanket of substantially oriented flakes; (iii) curing the first resin by exposing the first resin to at least one of an elevated temperature, an elevated pressure, and radiant energy; for a sufficient period of time; to effectively cure the first resin; thereby effectively providing a wood-based composite panel; and (iv) removing a portion of the panel, thereby providing a panel having a non-uniform width such that the width along at least one of the outer sides of the oppositely facing top and bottom surfaces is less than the width of the remaining portions of the panel.

The present invention also provides a process for manufacturing a wood-based composite panel that is not susceptible to top surface edge swell, the process includes: (i) contacting veneers of wood with a first resin; (ii) orienting, in alternating lengthwise and crosswise layers, the veneers of wood to provide a stack of alternating oriented veneers; (iii) curing the first resin by exposing the first resin to at least one of an elevated temperature, an elevated pressure, and radiant energy; for a sufficient period of time; to effectively cure the first resin; thereby effectively providing a wood-based composite panel; and (iv) removing a portion of the panel, thereby providing a panel having a non-uniform width such that the width along at least one of the outer sides of the oppositely facing top and bottom surfaces is less than the width of the remaining portions of the panel.

The present invention also provides a process for manufacturing a wood-based composite panel that is not susceptible to top surface edge swell, the process includes: (i) removing a portion of a wood-based composite panel, thereby providing a panel having a non-uniform width such that the width along at least one of the outer sides of the oppositely facing top and bottom surfaces is less than the width of the remaining portions of the panel.

BRIEF DESCRIPTION OF THE FIGURES

Embodiments of the invention may be best understood by referring to the following description and accompanying drawings which illustrate such embodiments. The numbering scheme for the Figures included herein are such that the leading number for a given reference number in a Figure is associated with the number of the Figure. For example, a wood-based composite panel (1) can be located in FIG. 1. However, reference numbers are the same for those elements that are the same across different Figures. In the drawings.

DETAILED DESCRIPTION OF THE INVENTION

Figure 1:
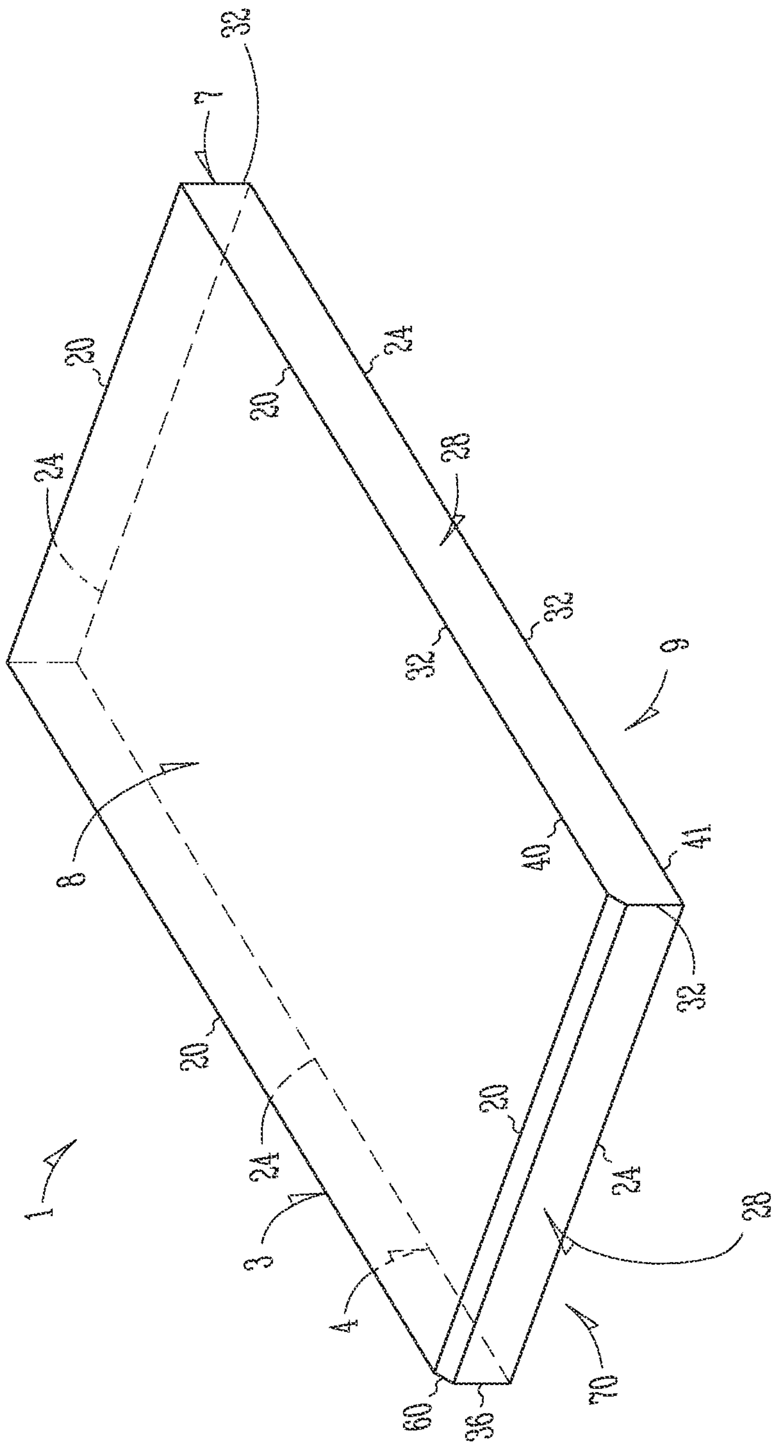
FIGS. 1-2 illustrate one embodiment of the panel with an edged plane at one end of the panel.

The present invention provides a wood-based composite panel that is not susceptible to top surface edge swell. The present invention also provides methods for manufacturing such wood-based composite panels.

The panel can be manufactured via a "hot press" or "in-line" method, or via a "cold press" or "off line" method. As such, each of the components of the panel can withstand the manufacturing conditions of any pressing stage involved in the manufacturing process. The manufacturing conditions include time, temperature, and pressure.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention relates to a novel wood-based composite panel that is not susceptible to top surface edge swell, and to methods of making such a panel. When describing the panel, and the methods of making the same, the following terms have the following meanings, unless otherwise indicated.

DEFINITIONS

As used herein, "adhered" refers to sticking together by or as if by grasping, suction or being glued. It includes joining, fastening, gluing, bonding, and fusing. The "adhering" can be accomplished by chemical means (e.g., adhesive or resin) by mechanical means (e.g., fastener), or a combination thereof.

As used herein, a "wood-based composite panel" or "panel" refers to a structural or non-structural product formed from a variety of materials including wood and/or wood substrate products (e.g., flakes or strands of wood, particles or particle strands of wood, fines or fines of wood, as well as veneers or veneers of wood). These materials are optionally formed from moisture-containing substrates, permeable substrates, and substrates which are both moisture-containing and permeable. Suitable wood-based composite panels include, e.g., particle board, oriented strand board (OSB), laminate veneer lumber (LVL), and plywood. The lifespan of the wood-based composite panel can be, e.g., up to about 25 years, up to about 50 years, or up to about 100 years. The panel can be configured, e.g., for tongue and groove fitting.

The wood-based composite panel will include a top surface and an oppositely facing bottom surface, as well as two pairs of opposing side surfaces. As with any rectangular prism, the wood-based composite panel more precisely and accurately includes six outer surfaces (i.e., three pairs of oppositely facing surfaces). As such, as used herein a "top surface" and an oppositely facing "bottom surface" refers to the two surfaces of the wood-based composite panel with the two largest surface areas. Additionally, as used herein, a "side surface" refers to a surface of the wood-based composite panel having a surface area less than the surface area of the top surface or the bottom surface. It is appreciated that those of skill in the art understand that the wood-based composite panel includes six outer surfaces (i.e., three pairs of oppositely facing surfaces), but reference to the wood-based composite panel as including a top surface, a bottom surface and two pairs of oppositely facing side surfaces is acceptable and appropriate to those of skill in the art.

The wood-based composite panel can include any suitable number of plies. Specifically, the wood-based composite panel can include up to about 25 plies, up to about 20 plies, up to about 15 plies, or up to about 10 plies. Additionally, the plies can have any suitable width. Specifically, the plies can have a width of up to about two plies per ½ inch of total wood-based composite width, up to about five plies per ½ inch of total wood-based composite width, up to about seven plies per ½ inch of total wood-based composite width, or up to about ten plies per ½ inch of total wood-based composite width.

The wood-based composite panel can optionally be fungal resistant, mold resistant, fire retardant, moisture resistant, termite resistant, or any combination thereof. For example, the wood-based composite panel can optionally include at least one of a fire retardant, a fungal resistant substance, moisture resistant substance, and a pesticide.

As used herein, "oriented strand board" or "OSB" refers to an engineered structural-use panel typically manufactured from thin wood strands bonded together with resin under heat, pressure, and/or radiant energy. The strands are typically dried, blended with resin and wax (e.g., paraffinic wax, microcrystalline wax, and mixtures thereof), and formed into thick, loosely consolidated mats or blankets that are pressed under heat and pressure into large panels. The strands in the core layers are usually aligned substantially perpendicular to the strand alignment of the face layers, like the cross-laminated veneers of plywood.

It is appreciated that those of skill in the art understand that OSB is typically characterized by those starting materials or intermediate components (e.g., resin and flakes of wood) that are useful in making the OSB. While these materials may undergo a substantial conversion during the manufacturing of the OSB, reference to OSB as including these materials or components is acceptable and appropriate to those of skill in the art. For example, the flakes of wood and the resin, during the pressing step (e.g., curing), can undergo a chemical and/or physical conversion, such that they may no longer expressly and literally meet the criteria to be classified as flakes of wood and resin, respectively. Reference to the OSB as including a resin and flakes of wood is, however, acceptable and appropriate to those of skill in the art. As such, as used herein, "oriented strand board" includes resin(s) and flakes of wood.

Suitable OSB, and methods for making the same, are disclosed, e.g., in U.S. Pat. Nos. 6,333,097; 6,136,408; 6,098,679; 5,718,786; 5,525,394; 5,470,631; 5,443,894; 5,425,976; 5,379,027; and 4,364,984.

As used herein, a "flake" refers to a thin stand of wood that is produced from a flaker. In addition, as used herein, a "green flake" refers to a flake that has not been dried. The flake can have any suitable size, provided the flake can be effectively cured with a suitable resin. For example, the flake can typically have a length (y-dimension) of up to about 12 inches (30.4 cm), or about 4.5 inches (11.4 cm) to about 6.0 inches (15.2 cm); and can typically have a width (x-dimension) of up to about 12 inches (30.4 cm), or about 1.5 inches (3.8 cm) to about 2.5 inches (6.4 cm). Likewise, the flake can typically have a width (z-dimension) of about 0.001 inches (0.0025 cm) to about 0.10 inches (0.254 cm), about 0.010 inches (0.0254 cm) to about 0.060 inches (0.1524 cm), or about 0.020 inches (0.0508 cm) to about 0.030 inches (0.076 cm). Typically, the width of the flake will be a function of the length of the flake. The length of the flake is typically at least about three times greater than the width of the flake. This allows for proper flake orientation and provides an OSB with acceptable physical properties.

As used herein, "blanket of flakes" refers to a plurality or mass of flakes having a discrete or continuous length, width, and height. The blanket of flakes can be formed, e.g., on a mat or a screen. A cross-sectional view of the blanket of flakes will typically illustrate that the flakes exist in multiple layers, thereby forming the blanket of flakes. The blanket of flakes can have a discrete length, width, and height. The blanket of flakes can typically have a width of up to about 16 feet, of up to about 12 feet, up to about 8 feet, or up to about 4 feet; a length of up to about 48 feet, of up to about 36 feet, or up to about 24 feet; and a width of up to about 2 feet, of up to about 1 foot, of up to about 8 inches, of up to about 6 inches, or of up to about 2 inches.

In another embodiment of the present invention, the blanket of flakes can have a discrete width, a discrete height, and a continuous length. In such an embodiment, the mat length or screen length can be greater than about 10 feet, greater than about 20 feet, or greater than about 40 feet. Such a mat or screen is typically referred to as a "continuous mat" or "continuous screen." The length of the blanket of flakes in such embodiment can typically be greater than about 10 feet, greater than about 20 feet, or greater than about 40 feet. In such an embodiment, the blanket of flakes can typically have a width of up to about 16 feet, up to about 12 feet, up to about 8 feet, or up to about 4 feet; and a width of up to about 2 feet, up to about 1 foot, up to about 8 inches, up to about 6 inches, or up to about 2 inches.

As used herein, "blanket of oriented flakes" refers to a blanket of flakes, as used herein, wherein each layer has flakes that are substantially perpendicular to the flakes in the layer directly below that specified layer (when present) and are substantially perpendicular to the flakes in the layer directly above that specified layer (when present).

As used herein, "plywood" refers to a laminate wood-based composite panel manufactured from thin wood veneers (i.e., laminates) bonded together with resin under heat and pressure. In one embodiment of the present invention, the plywood is manufactured from veneers of wood, wherein each veneer is perpendicular to the veneer directly above (if present) and directly below (if present) that veneer. In another embodiment of the present invention, each of the veneers face the same direction (e.g., in the lengthwise direction) to form what is referred to as laminate veneer lumber (LVL). In another embodiment, the veneers can be randomly oriented.

It is appreciated that those of skill in the art understand that plywood is typically characterized by those starting materials or intermediate components (e.g., resin and veneers of wood) useful in making the plywood. While these materials may undergo a substantial conversion during the manufacturing of the plywood, reference to the plywood as including these materials or components is acceptable and appropriate to those of skill in the art. For example, the veneers of wood and the resin, during the pressing step (e.g., curing), can undergo a chemical and/or physical conversion, such that they will no longer expressly meet the criteria to be classified as a veneer of wood and resin, respectively. Reference to the plywood as including a resin and veneers of wood, however, is acceptable and appropriate to those of skill in the art. As such, as used herein, "plywood" includes resin(s) and veneers of wood.

Suitable plywood, and methods for making the same, are disclosed, e.g., in Engineered Wood Products, A Guide for Specifiers, Designers and Users, Stephen Smulski, Ph.D, Editor in Chief, PFS Research Foundation, Madison, Wis. especially Chapter 2, Plywood by Michael McKAy; or Wood Handbook, Wood as an Engineered Material, reprinted from Forest Products Laboratory General Technical Report FPL-GTR-113 with consent of the USDA Forest Service, Forest Products Laboratory, especially Chapter 10-6, Wood Based Composites and Panel Products, Plywood. Specifically, the plywood can be any suitable plywood as manufactured by, e.g., Georgia-Pacific, Boise-Cascade, Nexfor Industries, Willamette, Roseburg Forest Products, Louisiana-Pacific, Weyerhaeuser, Hood Industries, Plum Creek, or Hunt Plywood Co.

As used herein, "particle board" refers to an engineered wood-based composite panel typically manufactured from wood particles bonded together with resin under heat, pressure, and/or radiant energy. The particles are typically dried, blended with resin and wax, and formed into thick, loosely consolidated mats or blankets that are pressed under heat and pressure into large panels.

It is appreciated that those of skill in the art understand that particle board is typically characterized by those starting materials or intermediate components (e.g., resin and particles or fines) useful in making the particle board. While these materials may undergo a substantial conversion during the manufacturing of the particle board, reference to the particle board as including these materials or components is acceptable and appropriate to those of skill in the art. For example, the particles or fines of wood and the resin, during the pressing step (e.g., curing), can undergo a chemical and/or physical conversion, such that they will no longer expressly meet the criteria to be classified as a fine or particle of wood and resin, respectively. Reference to the plywood as including a resin and a fine or particle of wood, however, is acceptable and appropriate to those of skill in the art. As such, as used herein, "particle board" includes resin(s) and fines or particles of wood.

A used herein, "wood particles," "particles of wood" or "fines" refer to particles of wood having an average diameter of up to about 0.05 inches, up to 0.005 inches, or up to 0.0005 inches.

As used herein, "continuous press" refers to a method of manufacturing a wood-based composite panel wherein a press mat moves into the press in a continuous manner. Such a manner can be accomplished, e.g., by employing a series of rollers that push down upon the flakes, veneers, and/or wood particles. Those of skill in the art typically refer to a continuous press as having no mat length. It is appreciated that those of skill in the art understand that such reference is intended to refer to mats having a length, e.g., of more than about 20 feet.

As used herein, "off-line" refers to a method of manufacturing a wood-based composite panel that includes two steps; one step to manufacture the wood-based composite panel and another step to remove a portion of the panel. The off line process can include a "cold press" method of removing a portion of the panel.

As used herein, "on-line" or "in-line" refers to a method of manufacturing a wood-based composite panel that includes one step. The one step involves both manufacturing the wood-based composite panel and removing a portion of the panel. The on-line process can include a "hot press" method of removing a portion of the panel.

As used herein, "manufacturing conditions" refers to those conditions (e.g., time, temperature, and pressure) involved in any of the steps in the manufacturing of a wood-based composite panel. Those steps include, for example, the pressing stage.

As used herein, "elevated temperature" refers to any temperature above room temperature, 77° F. (25° C.). Typically, the elevated temperature can be above about 100° C. (212° F.), above about 150° C. (302° F.), above about 200° C. (392° F.), or up to about 250° C. (482° F.). Specifically, the elevated temperature can be about 77° F. (25° C.) to about 315° C. (599° F.), about 100° C. (212° F.) to about 315° C. (599° F.), about 77° F. (25° C.) to about 218° C. (425° F.), about 100° C. (212° F.) to about 218° C. (425° F.), or about 175° C. (374° F.) to about 218° C. (425° F.).

Specifically, regarding oriented strand board (OSB) and methods for making the same, "elevated temperature" can be about 162° C. (325° F.) to about 246° C. (475° F.), about 177° C. (350° F.) to about 232° C. (450° F.), or about 191° C. (375° F.) to about 218° C. (425° F.). Specifically, regarding plywood and methods for making the same, "elevated temperature" can be about 107° C. (225° F.) to about 218° C. (425° F.), about 121° C. (250° F.) to about 204° C. (400° F.), or about 135° C. (275° F.) to about 191° C. (375° F.).

As used herein, "elevated pressure" refers to any pressure above standard pressure, 1 atm. (14.7 psi). Typically, the elevated pressure can be above about 5.0 atm (73.5 psi), above about 10.0 atm (146.9 psi), above about 20.0 atm (293.9 psi), above about 40.0 atm (587.8 psi), or above about 80.0 atm (1175.7 psi). Specifically, the elevated pressure can be about 60.0 atm. (881.8 psi) to about 85.0 atm (1249 psi).

Specifically, regarding oriented strand board (OSB) and methods for making the same, "elevated pressure" can be about 25 atm. (367 psi) to about 55 atm. (808 psi), about 30 atm. (441 psi) to about 50 atm. (735 psi), about 34 atm. (500 psi) to about 48 atm. (705 psi), or about 35 atm. (514 psi) to about 45 atm. (661 psi).

Specifically, regarding plywood and methods of making the same, "elevated pressure" can be about 8.0 atm. (118 psi) to about 21 atm (309 psi) or about 10.0 atm. (147 psi) to about 17 atm (250 psi).

As used herein, "resin" refers to an adhesive polymer of either natural or synthetic origin. As used herein, a "polymer" is a compound formed by the reaction of simple molecules having functional groups that permit their combination to proceed to higher molecular weights under suitable conditions. Synthetic polymers are chemically designed and formulated into the adhesive to perform a variety of bonding functions.

As used herein, "impregnate" refers to the filling, permeation, or saturation of a material (e.g., resin) into a substrate (e.g., flake, veneer, fine, OSB, LVL, or plywood).

As used herein, "completely impregnate" refers to about 100% impregnation of a material (e.g., resin) into a substrate (e.g., flake, veneer, fine, OSB, LVL, or plywood).

As used herein, "partially impregnate" refers to an impregnation of a material (e.g., resin) into a substrate (e.g., flake, veneer, fine, OSB, LVL, or plywood), of less than about 100%. The impregnation can be up to about 1/100 of the substrate, up to about 1/50 of the substrate, up to about 1/10 of the substrate, up to about 1/4 of the substrate, up to about 1/2 of the substrate, up to about 3/4 of the substrate, or up to about 99/100 of the substrate. More specifically, the impregnation can be about 1/20 to about 1/2 of the substrate.

As used herein, a "fungal resistant wood-based composite panel" or "fungal resistant panel" refers to a panel, as defined herein, that is fungal resistant. The fungal resistant panel possesses the ability to kill, destroy, inhibit, or inactivate a fungus thereby preventing growth more than had the panel not include a fungicide. Specifically, the amount, if any, fungus present and growing on the surface will typically be less than about 25%, less than about 10%, less than about 5%, or less than about 1% of the fungus present and growing on the surface of an equivalent substrate that is non-fungal resistant and does not include a fungicide.

The fungal resistant panel will preferably meet the necessary requirements to be certified as a fungal resistant panel. In doing so, the fungal resistant panel, upon testing, will be approved by the relevant building codes and insurance rating bureaus typically known to those of skill in the art. The fungal resistant panel, upon testing, will meet or exceed the requirements of a fungal resistant panel, as promulgated by the relevant code sections for one or more of the following entities: Building Officials and Code Administrators International, Inc. (BOCA) National Building Code; Standard Building Code (SBC); Uniform Building Code (UBC); American Society for Testing Materials (ASTM); American Wood-Preservers' Association (AWPA); Underwriters Laboratories, Inc. (UL); U.S. Department of Defense (DOD); Military Specification (Mil); City of Los Angeles, Calif.; City of New York, N.Y. Building Code; International Conference of Building Officials (ICBO); and Southern Building Code Congress International, Inc. (SBCCI).

The fungal resistant panel can either be surface treated or integrally treated. When surface treated, the flakes or veneers present only on the outwardly facing surface(s) of the OSB or plywood are treated with the fungicide. When integrally treated, up to 100% of the flakes or veneers are treated with the fungicide. Such flakes or veneers may me present on both the outside and the inside of the OSB or plywood. As such, the fungicide can be impregnated, completely impregnated, or partially impregnated into the substrate (e.g., flake, veneer, fine, OSB, LVL, or plywood), thereby providing a fungal resistant panel.

As used herein, a "fungicide" or "antifungal agent" refers to a chemical that will kill, destroy, inhibit, or inactivate a fungus to prevent growth. The chemical can be synthetic or biosynthetic and can include both organic and inorganic compounds. The fungicide can be a solid (e.g., powder), liquid, or a combination thereof. See, e.g., Concise Chemical and Technical Dictionary, Fourth Enlarged edition, Bennett, Chemical Publishing Company, NY, N.Y. (1986); and McGraw-Hill Concise Encyclopedia of Science & Technology, Fourth Edition, Parker, McGraw-Hill, NY, N.Y., (1998). Specifically, "fungicide" or "antifungal agent" can include a chemical that will kill, destroy, inhibit, or inactivate a eucaryotic microorganism to prevent growth. Exemplary eucaryotic microorganisms include algae, fungi, slime mold, protozoa, and eucaryotes in the microbial world.

Suitable fungicides include, e.g., formic acid, acetic acid, propionic acid, pelargonic acid, capric acid, copper ammonium acetate (CAA), copper naphthenate, and combinations thereof.

Suitable anti-mold agents include formic acid, acetic acid, propionic acid, pelargonic acid, capric acid, copper ammonium acetate (CAA), copper naphthenate, or a combination thereof.

The wood-based composite can optionally include fines or fines of wood located near the outer surface(s) of the wood-based composite.

As used herein, "moisture vapor permeability" refers to the amount of moisture vapor that can pass through a specified amount of substance in a specified period of time, usually expressed in units of g/hr-m$^2$-mm Hg. Specifically, the panel of the present invention can have a moisture vapor permeability of up to about 0.025 g/hr-m$^2$-mm Hg, or up to about 0.0005 g/hr-m$^2$-mm Hg.

As used herein, "fire retardant" refers to a substance that can exhibit an acceptable flame spread and smoke rating (e.g., about 30 or less, about 25 or less, about 20 or less, or about 15 or less). Additionally, it refers to a substance that can show little or no evidence of significant progressive combustion at a relatively long period of time (e.g., about 45 minutes or more, about 60 minutes or more, about 75 minutes or more, or about 90 minutes or more) of exposure to a flame. Suitable fire retardants include, e.g., phosphoammonium boron compositions; 3,4,5,6-dibemzo-1,2-oxaphosphane-2-oxide or 9,10-dihydro-9-oxa-10-phospaphenanthrene-10-oxide (OPC); sulfamic acid monoammonium salt (ammonium sulfamate); di-n-butyltin oxide (DBTO); di-n-octyltin oxide (DOTO); dibutyltin diacetate di-n-butyltin diacetate (NS-8); dibutyltin dilaurate di-n-butyltin dilaurate (Stann BL); ferrocene; iron pentacarbonyl; ammonium sulfate; ammonium phosphate; zinc chloride; or a combination thereof.

As used herein, a "fire retardant wood-based composite panel" or "fire retardant panel" refers to a wood-based composite panel, as defined herein, that is fire retardant.

The fire retardant panel will preferably meet the necessary requirements to be certified as a fire retardant panel. In doing so, the fire retardant panel, upon testing, will be approved by the relevant building codes and insurance rating bureaus typically known to those of skill in the art. The fire retardant panel, upon testing, will meet or exceed the requirements of a fire retardant panel, as promulgated by the relevant code sections for one or more of the following entities: Building Officials and Code Administrators International, Inc. (BOCA) National Building Code; Standard Building Code (SBC); Uniform Building Code (UBC); American Society for Testing Materials (ASTM); American Wood-Preservers' Association (AWPA); National Fire Protection Association (NFPA); Underwriters Laboratories, Inc. (UL); U.S. Department of Defense (DOD); Military Specification (Mil); City of Los Angeles, Calif.; City of New York, N.Y. Building Code; International Conference of Building Officials (ICBO); and Southern Building Code Congress International, Inc. (SBCCI).

Specifically, the fire retardant panel can be certified by Underwriters Laboratories (UL); the fire retardant panel can carry an "FRS" rating under UL classification, exhibiting acceptable flame spread and smoke rating (e.g., 25 or less); the fire retardant panel can preferably show little or no evidence of significant progressive combustion at a relatively long period of time (e.g., 60 minutes or more) of exposure to flame; and/or the fire retardant panel can be classified as a Type A fire retardant as defined in AWPA Standards.

Specifically, the fire retardant panel can be classified as a wood-based composite panel which, when impregnated with a fire retardant by a pressure process or other means during manufacturing, can have when treated in accordance with ASTM E84, Standard test Method or Surface Burning Characteristics of Building Materials, a flamespread index of 25 or less and can show no evidence of significant progressive combustion when the test is continued for an additional 20 minute period. In addition, the flame front should not progress more than 10.5 feet beyond the center line of the burner at any time during the test.

The fire retardant panel can either be surface treated or integrally treated. When surface treated with the fire retardant, the flakes or veneers present only on the outwardly facing surface(s) of the OSB or plywood are treated with a fire retardant. Alternatively, when integrally treated with the fire retardant, up to 100% of the flakes or veneers are treated with a fire retardant. Such flakes or veneers may me present on both the outside and the inside of the OSB or plywood. As such, the fire retardant can be impregnated, completely impregnated, or partially impregnated into the substrate (e.g., flake, veneer, fine, OSB, LVL, or plywood), thereby providing a fire retardant panel.

As used herein, "fungi" or "fungus" refers to a large and diverse group of eucaryotic microorganisms whose cells contain a nucleus, vacuoles, and mitochondria. Fungi include algae, molds, yeasts, mushrooms, and slime molds. See, Biology of Microorganisms, T. Brock and M. Madigan, 6th Ed., 1991, Prentice Hill (Englewood Cliffs, N.J.). Exemplary fungi include Ascomycetes (e.g., Neurospora, Saccharomyces, Morchella), Basidiomycetes (e.g., Amanita, Agaricus), Zygomycetes (e.g., Mucor, Rhizopus), Oomycetes (e.g., Allomyces), and Deuteromycetes (e.g., Penicillium, Aspergillus).

As used herein, "algae" refers to a large and diverse assemblage of eucaryotic organisms that contain chlorophyll and carry out oxygenic photosynthesis. See, Biology of Microorganisms, T. Brock and M. Madigan, 6th Ed., 1991, Prentice Hill (Englewood Cliffs, N.J.). Exemplary algae include Green Algae (e.g., Chlamydomonas), Euglenids (e.g., Euglena), Golden Brown Algae (e.g., Navicula), Brown Algae (e.g., Laminaria), Dinoflagellates (e.g., Gonyaulax), and Red Algae (e.g., polisiphonia).

As used herein, "mold" refers to a filamentous fungus, generally a circular colony that may be cottony, wooly, etc. or glabrous, but with filaments not organized into large fruiting bodies, such as mushrooms. See, e.g., Stedman's Medical Dictionary, 25th Ed., Williams & Wilkins, 1990 (Baltimore, Md.). One exemplary mold is the Basidiomycetes called wood-rotting fungi. Two types of wood-rotting fungi are the white rot and the brown rot. An ecological activity of many fungi, especially members of the Basidiomycetes is the decomposition of wood, paper, cloth, and other products derived from natural sources. Basidiomycetes that attack these products are able to utilize cellulose or lignin as carbon and energy sources. Lignin is a complex polymer in which the building blocks are phenolic compounds. It is an important constituent of woody plants. The decomposition of lignin in nature occurs almost exclusively through the agency of these wood-rotting fungi. Brown rot attacks and decomposes the cellulose and the lignin is left unchanged. White rot attacks and decomposes both cellulose and lignin. See, Biology of Microorganisms, T. Brock and M. Madigan, 6th Ed., 1991, Prentice Hill (Englewood Cliffs, N.J.).

As used herein, "yeast" refers to unicellular fungi, most of which are classified with the Ascomytes. See, Biology of Microorganisms, T. Brock and M. Madigan, 6th Ed., 1991, Prentice Hill (Englewood Cliffs, N.J.).

As used herein, "mushrooms" refer to filamentous fungi that are typically from large structures called fruiting bodies, the edible part of the mushroom. See, Biology of Microorganisms, T. Brock and M. Madigan, 6th Ed., 1991, Prentice Hill (Englewood Cliffs, N.J.).

As used herein, "slime molds" refers to nonphototrophic eucaryotic microorganisms that have some similarity to both fungi and protozoa. The slime molds can be divided into two groups, the cellular slime molds, whose vegetative forms are composed of single amoebalike cells, and the acellular slime molds, whose vegetive forms are naked masses of protoplasms of indefinite size and shape called plasmodia. Slime molds live primarily on decaying plant matter, such as wood, paper, and cloth. See, Biology of Microorganisms, T. Brock and M. Madigan, 6th Ed., 1991, Prentice Hill (Englewood Cliffs, N.J.).

As used herein, "fungal resistant" refers to a substrate (e.g., wood-based composite panel) that has no appreciable amount of fungus present or growing on the surface therein. The amount, if any, fungus present or growing on the surface will typically be less than about 25%, less than about 10%, less than about 5%, or less than about 1% of the fungus present or growing on the surface of an equivalent substrate that is non-fungal resistant. The fungal resistant substrate will typically include a chemical that will kill, destroy, inhibit, or inactivate a eucaryotic microorganism to prevent growth. Exemplary eucaryotic microorganisms include algae, fungi, slime mold, protozoa, and eucaryotes in the microbial world. The substrate (e.g., wood-based composite panel) can be fungal resistant due to the presence of one or more fungicides present on and/or in the substrate.

As used herein, "termite resistant" refers to a substrate (e.g., panel) that has no appreciable amount of termites that eat a portion of the substrate. The amount, if any, termites that eat a portion of the substrate will typically be less than about 25%, less than about 10%, less than about 5%, or less than about 1% of the termites that would eat a portion of an equivalent substrate that is non-termite resistant. "Termite resistant" also refers to a substrate having the ability to prevent, mitigate, or lessen the likelihood of termites from eating, consuming or otherwise degrading a substrate more so than had the substrate not include a pesticide.

As used herein, a "termite resistant wood-based composite panel" or "termite resistant panel" refers to a wood-based composite panel, as defined herein, that is termite resistant. The termite resistant panel will preferably meet the necessary requirements to be certified as a termite resistant wood-based composite panel. In doing so, the termite resistant panel, upon testing, will be approved by the relevant building codes and insurance rating bureaus typically known to those of skill in the art. The termite resistant panel, upon testing, will meet or exceed the requirements of a termite resistant panel, as promulgated by the relevant code sections for one or more of the following entities: Building Officials and Code Administrators International, Inc. (BOCA) National Building Code; Standard Building Code (SBC); Uniform Building Code (UBC); American Society for Testing Materials (ASTM); American Wood-Preservers' Association (AWPA); Underwriters Laboratories, Inc. (UL); U.S. Department of Defense (DOD); Military Specification (Mil); City of Los Angeles, Calif.; City of New York, N.Y. Building Code; International Conference of Building Officials (ICBO); and Southern Building Code Congress International, Inc. (SBCCI).

As used herein, a "pesticide" refers to a chemical that is used as an insecticide, fungicide, acaricide (miticide), herbicide, rodenticide, bactericide, parasiticide, nematicide, and others used against pests. The chemical is used for the mitigation, control, or elimination of animals or plants detrimental to human health or economy. The chemical can be synthetic or biosynthetic and can include both organic and inorganic compounds. The pesticide can be a solid (e.g., powder), liquid, or a combination thereof. See, e.g., Concise Chemical and Technical Dictionary, Fourth Enlarged edition, Bennett, Chemical Publishing Company, NY, N.Y. (1986); and McGraw-Hill Concise Encyclopedia of Science & Technology, Fourth Edition, Parker, McGraw-Hill, NY, N.Y., (1998). "Pesticide" also refers to a substance, that when added to wood-based composite panel, will diminish the likelihood of a termite from eating a portion of the wood-based composite panel, over the extended periods of time typically encountered with the lifespan of the wood-based composite panel (e.g., up to about 25 years, up to about 50 years, or up to about 100 years).

One suitable pesticide useful in the present invention includes copper ammonium carbonate (CAC).

As used herein, "moisture resistant" refers to a substance that has a relatively low water permeability. Moisture resistant substances will have a relatively low amount of water that can pass through a specified amount of the substance in a specified period of time, usually expressed in units of g/hr-m$^2$-mm Hg. Specifically, the panel of the present invention can have a water permeability of up to about 0.025 g/hr-m$^2$-mm Hg, or up to about 0.0005 g/hr-m$^2$-mm Hg.

The panel will preferably meet the necessary requirements to be certified as a wood-based composite panel. In doing so, the panel, upon testing, will be approved by the relevant building codes and insurance rating bureaus typically known to those of skill in the art. The panel, upon testing, will meet or exceed the requirements of a panel, as promulgated by the relevant code sections for one or more of the following entities: Building Officials and Code Administrators International, Inc. (BOCA) National Building Code; Standard Building Code (SBC); Uniform Building Code (UBC); American Society for Testing Materials (ASTM); American Wood-Preservers' Association (AWPA); Underwriters Laboratories, Inc. (UL); U.S. Department of Defense (DOD); Military Specification (Mil); City of Los Angeles, Calif.; City of New York, N.Y. Building Code; International Conference of Building Officials (ICBO); and Southern Building Code Congress International, Inc. (SBCCI).

Referring to FIGS. 1-11, a wood-based composite panel (1) of the present invention, and methods of making the same, are provided. The wood-based composite panel (1) of the present invention includes a top surface (8) having four opposing sides (20) that define a perimeter (3); and a bottom surface (9) opposite the top surface (8) and having four opposing sides (24) that define a perimeter (4); the top and bottom surfaces (8) and (9) respectively forming a non-uniform width, such that the width along at least one of the four opposing sides (20) and (24) respectively of the oppositely facing top and bottom surfaces (8) and (9) respectively is less than the thickness of the remaining portions of the panel (1).

More specifically, Referring to FIGS. 1-10, a wood-based composite panel (1) and methods of making the same, are provided. The wood-based composite panel (1) includes a top surface (8) having four opposing sides (20) that define a perimeter (3) of the top surface (8). The panel (1) also includes a bottom surface (9) having four opposing sides, (24) that define a perimeter (4) of the bottom surface (9). The top surface (8) is opposite the bottom surface (9). The panel (1) also includes two pairs of (i.e., four) opposing side surfaces (28). Each side surface (28) has four opposing sides (32), that define a perimeter (7) of the side surfaces (28). A first pair of opposing sides (32) of the side surface (28) are in perimetric communication with a second pair of opposing sides (32) of the side surfaces (28). Any of the side surfaces (28), together with the two adjacent side surfaces (28), form two side edges (36). As such, all of the side surfaces (28), combined, form four side surface edges (36).

A side (32) of each of the side surfaces (28) is in perimetric communication with the perimeter (3) of the top surface (8), forming four top surface (8) edges (40). A side (32) of each of the side surfaces (28) is also in perimetric communication with the perimeter (4) of the bottom surface (9), forming four bottom surface (9) edges (41).

The panel (1) has a non-uniform edged plane (60), such that the edged plane (60) along at least one of the four opposing sides (20) of the top surface (8), that defines a perimeter (3) of the top surface (8), is less than the edged plane (60) of the remaining portions of the panel (1). When the edged plane (60) along at least one of the four opposing sides (20) of the top surface (8) is less than the edged plane (60) of the remaining portions of the panel (1), the amount of the edged plane (60) that is reduced, will typically correspond to the amount of swelling the panel (1) would otherwise undergo, due to water absorption, had there not been a difference in edged plane (60).

In one embodiment, the difference in edged plane (60) (represented by a width (50) removed) can be up to about one tenth of an inch. Additionally, in a specific embodiment of the present invention, the edged plane (60) will vary starting at the outer side (20) of the top surface (8) and can terminate up to about two inches therefrom. This distance is represented as length (51) removed. The volume of panel (2) that is removed is a function of the width (50) removed and the length (51) removed, and is designated as the volume removed (52). Length (51) removed will typically correspond to the distance that an equivalent panel (2), with no volume removed (52), will flare above the plane of the top surface (8).

Figure 2:
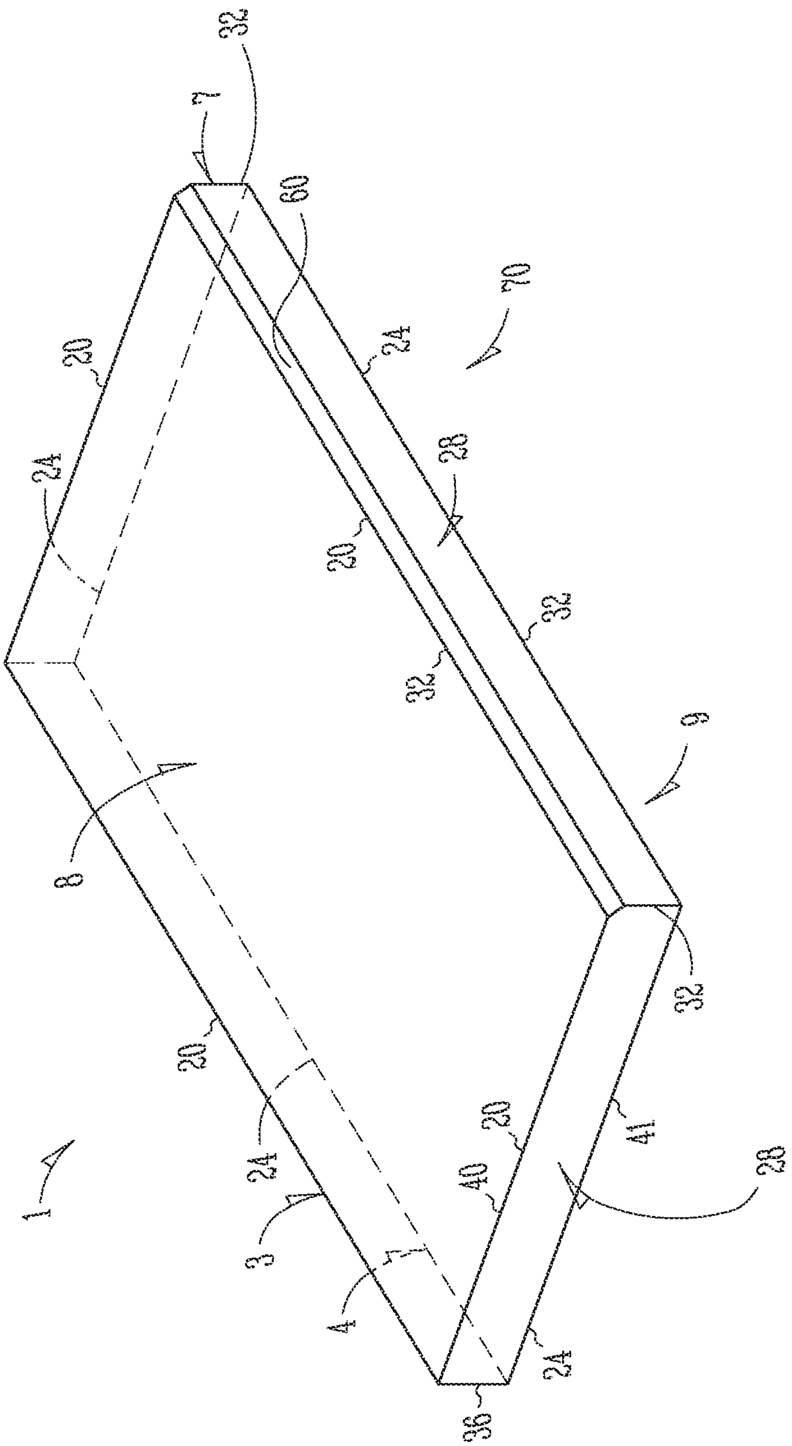

FIGS. 1-2 illustrate one embodiment of the panel (1) with an edged plane (60) at one end (70) of the panel (1).

Figure 3:
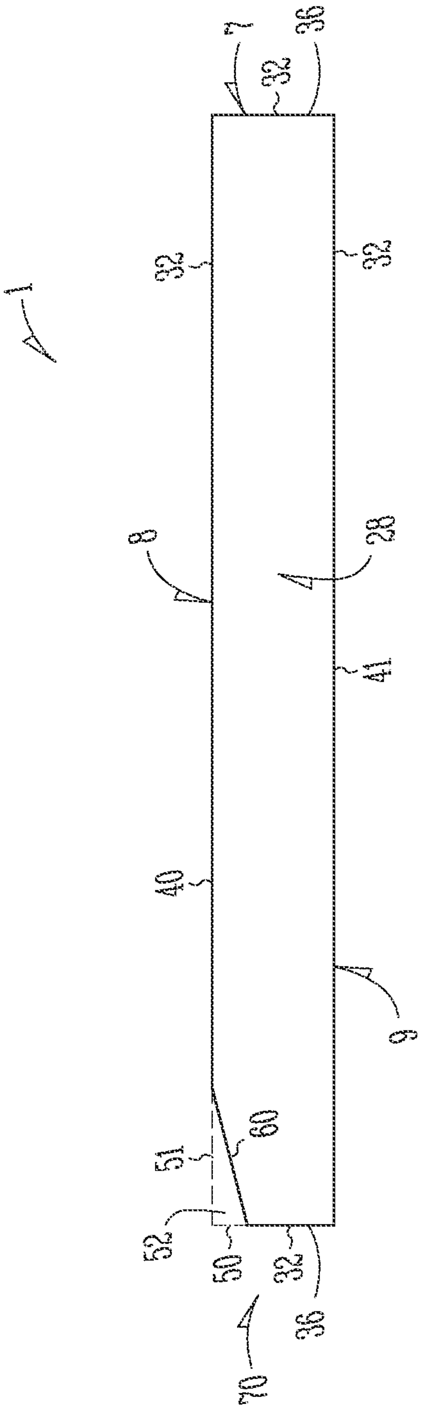
FIGS. 3-4 illustrate a side view of one embodiment that includes a length and a width removed from a portion of the top surface, one side surface and two opposing side surfaces creating the edged plane at one end of the panel.
Figure 4:
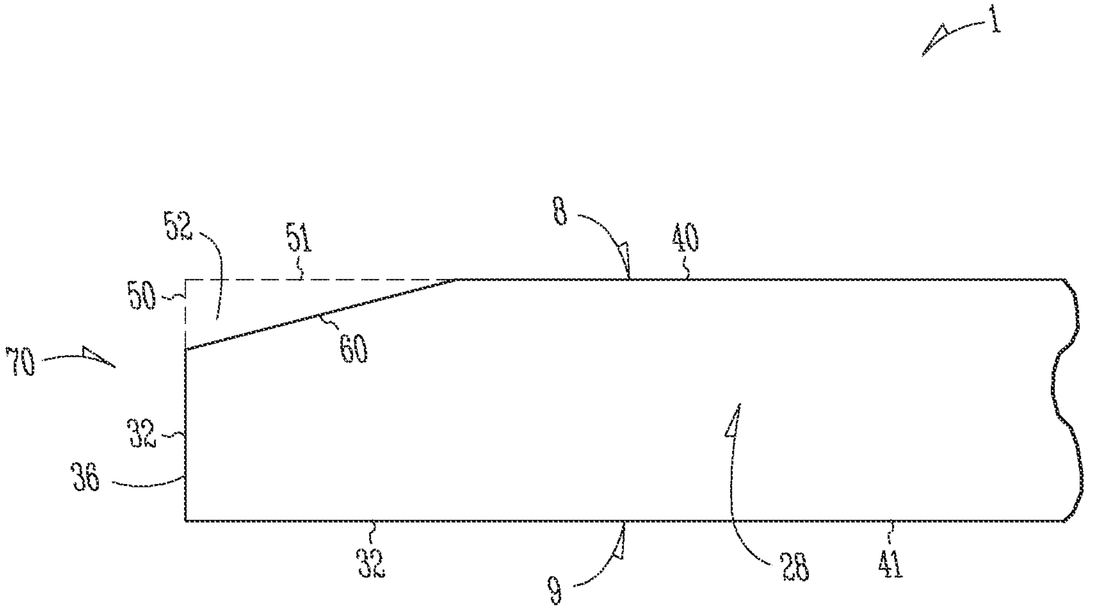

FIGS. 3-4 illustrate a side view of one embodiment that includes a length (52) and a width (50) removed from a portion of the top surface (8), one side surface (28) and two opposing side surfaces (28) creating the edged plane (60) at one end (70) of the panel (1).

Figure 5:
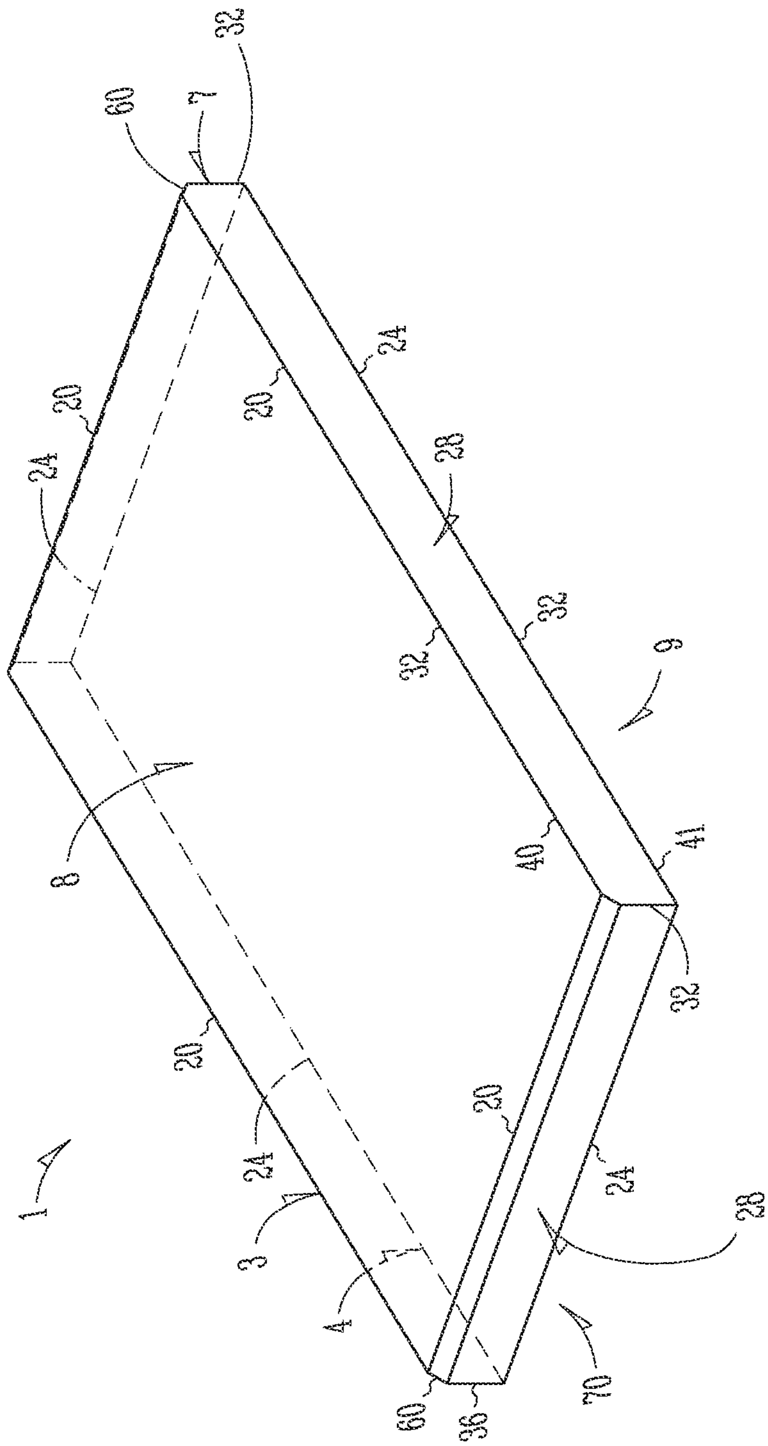
FIGS. 5-6 illustrate another embodiment that includes two edged planes located at opposite ends of the panel.
Figure 6:
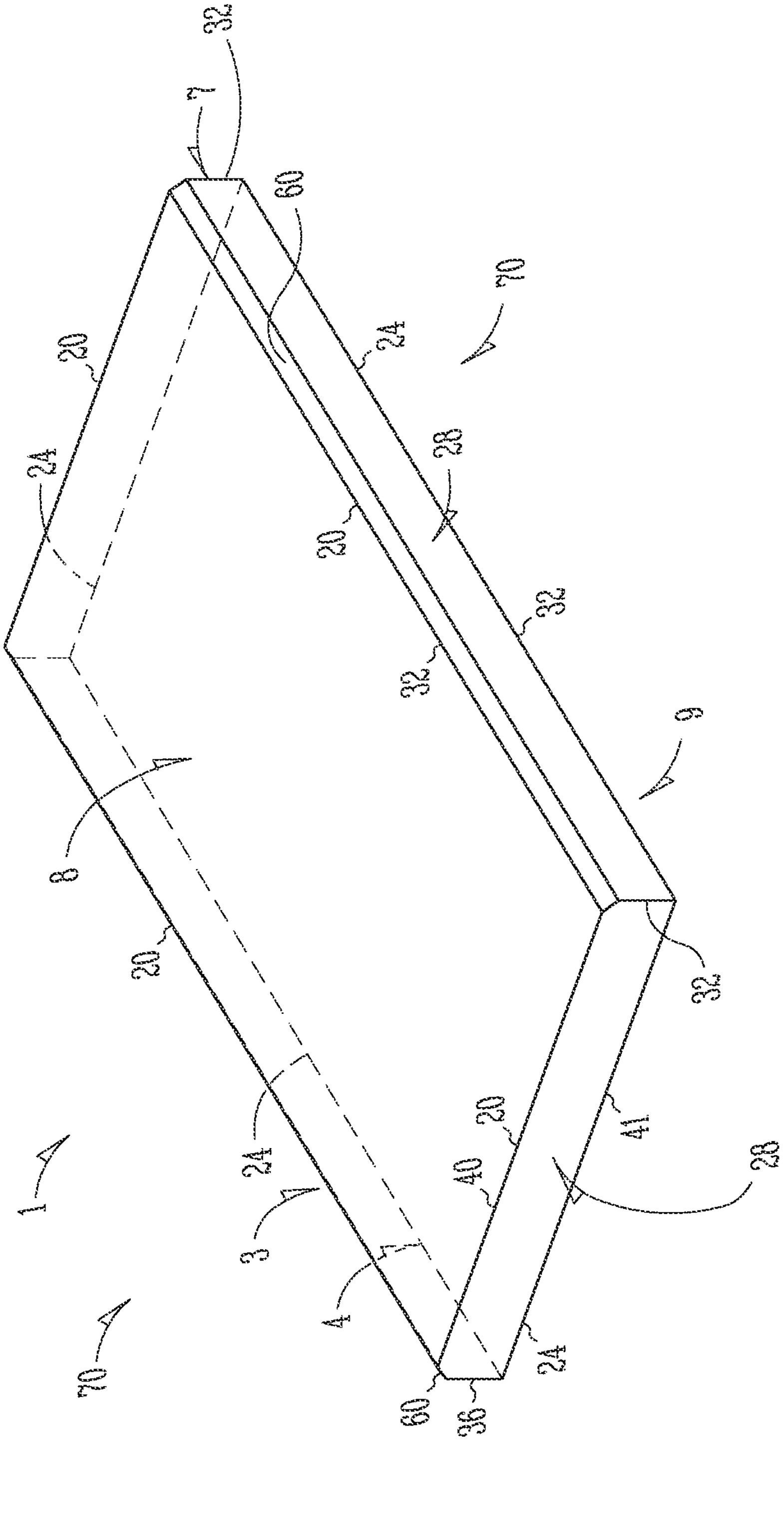

FIGS. 5-6 illustrate another embodiment that includes two edged planes (60) located at opposite ends (70) of the panel (1).

Figure 7:
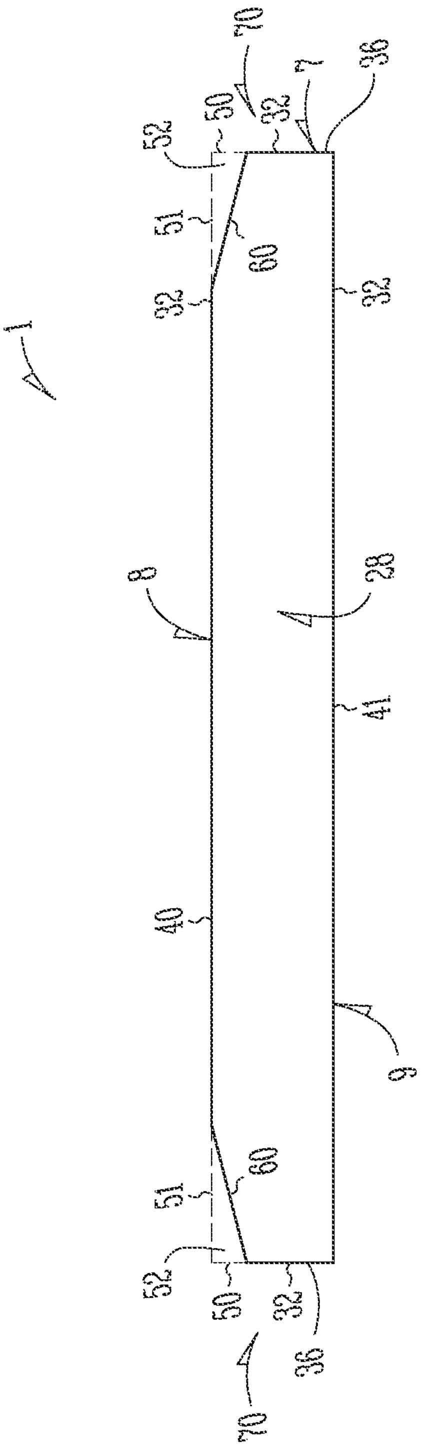
FIG. 7 illustrates a side view of one embodiment that includes two lengths and two widths removed from opposite ends of two side surfaces and opposite ends of the top surface creating two edged planes at opposing ends of the panel.

FIG. 7 illustrates a side view of one embodiment that includes two lengths (52) and two widths (50) removed from opposite ends of two side surfaces (28) and opposite ends of the top surface (8) creating two edged planes (60) at opposing ends (70) of the panel (1).

Figure 8:
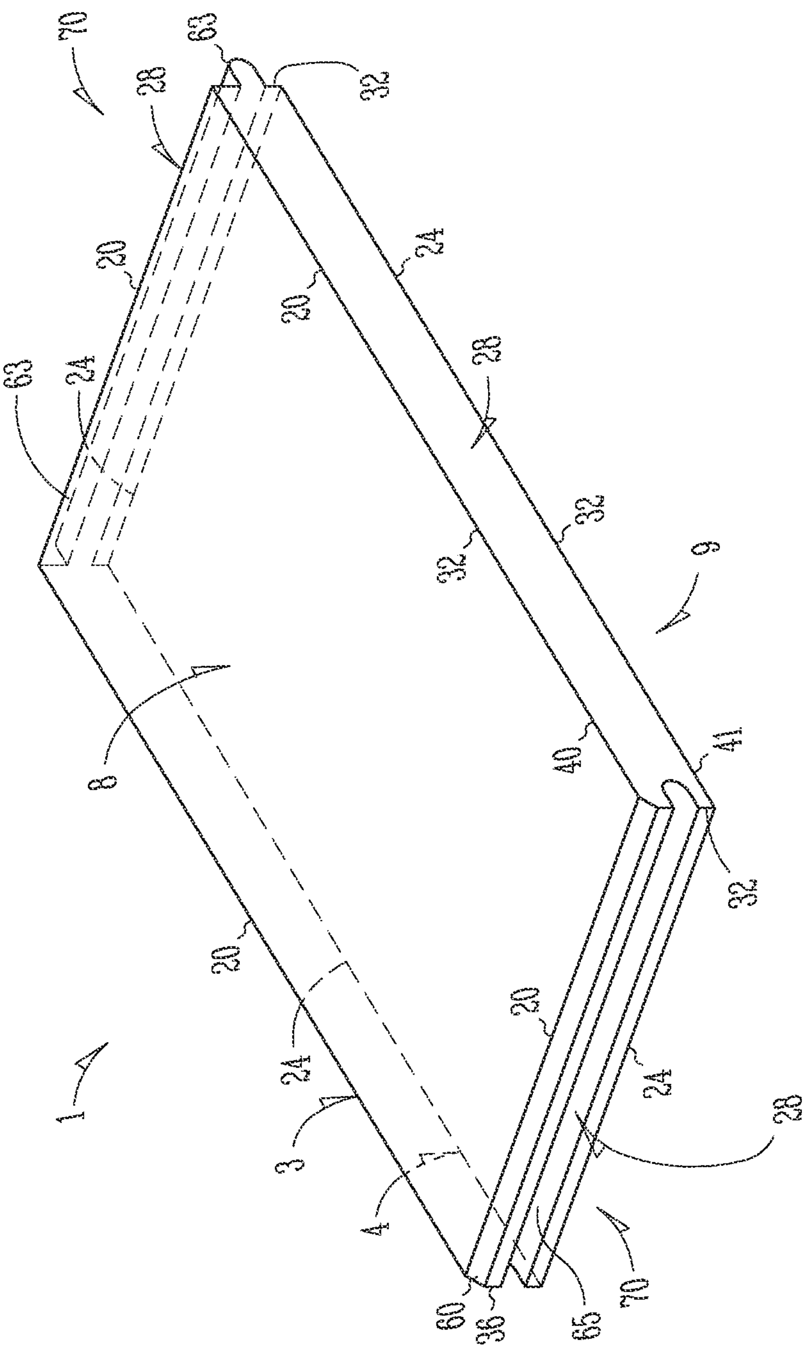
FIG. 8 illustrates one embodiment of the panel with one edged plane formed at one end of the panel. A groove is notched from one side surface and two opposing side surfaces at one end of the panel and a tongue protrudes from the entire length of a side surface at another end of the panel.

FIG. 8 illustrates one embodiment of the panel (1) with one edged plane (60) formed at one end (70) of the panel (1). A groove (65) is notched from one side surface (28) and two opposing side surfaces (28) at one end (70) of the panel (1) and a tongue (63) protrudes from the entire length of a side surface (28) at another end (70) of the panel (1).

In another embodiment, the panel (1) includes two or more edged planes (60). In one embodiment, the groove (65) is notched from only a portion of one side surface (28) and two opposing side surfaces (28) at one end (70) of the panel (1). In another embodiment, one or more grooves (65) are formed at one or more ends (70) of the panel (1). In another embodiment, the tongue (63) protrudes from only a portion of the length of the side surface (28). In yet another embodiment, one or more tongues (63) protrude from one or more side surfaces (28).

Figure 9:
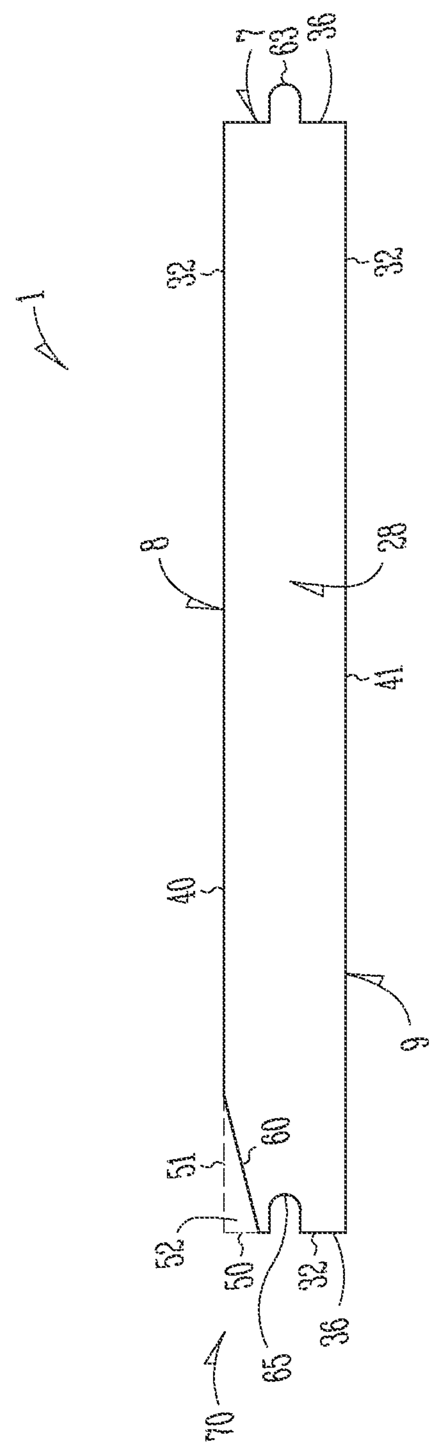
FIG. 9 illustrates a side view of one embodiment of the panel that includes the length and the width removed from a portion of the top surface, one side surface and two opposing side surfaces creating the edged plane at one end of the panel. A groove is notched from one side surface and two opposing side surfaces at one end of the panel and a tongue protrudes from the entire length of a side surface at another end of the panel.

FIG. 9 illustrates a side view of one embodiment of the panel (1) that includes the length (52) and the width (50) removed from a portion of the top surface (8), one side surface (28) and two opposing side surfaces (28) creating the edged plane (60) at one end (70) of the panel (1). A groove (65) is notched from one side surface (28) and two opposing side surfaces (28) at one end (70) of the panel (1) and a tongue (63) protrudes from the entire length of a side surface (28) at another end (70) of the panel (1).

Figure 10:
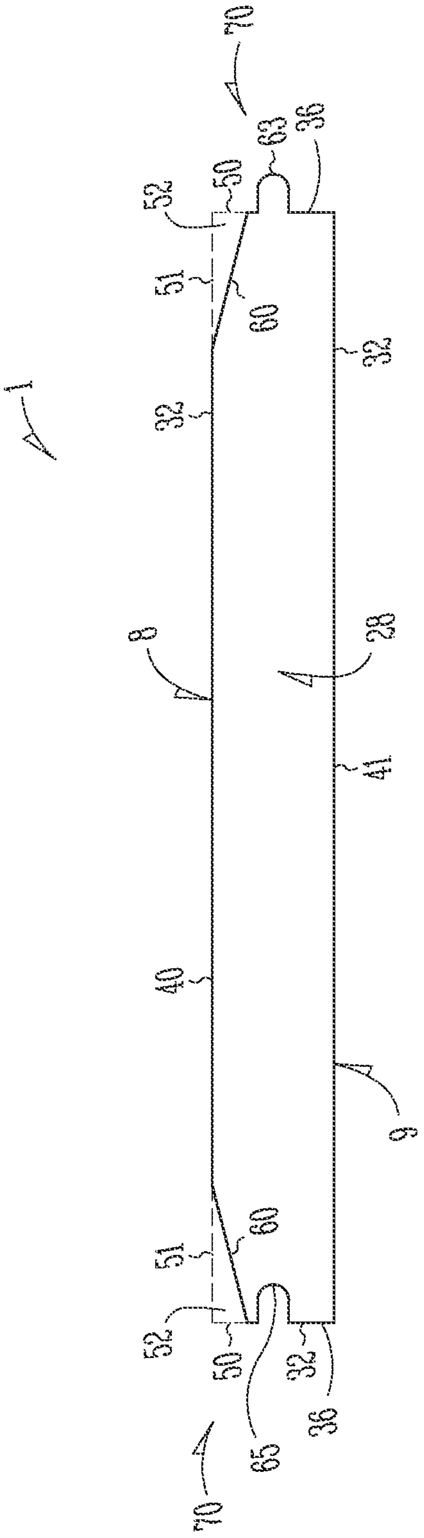
FIG. 10 illustrates a side view of one embodiment that includes two lengths and two widths removed from opposite ends of two side surfaces and opposite ends of the top surface creating two edged planes at opposing ends of the panel. A groove is notched from one side surface and two opposing side surfaces at one end of the panel and a tongue protrudes from the entire length of a side surface at another end of the panel.
Figure 11:
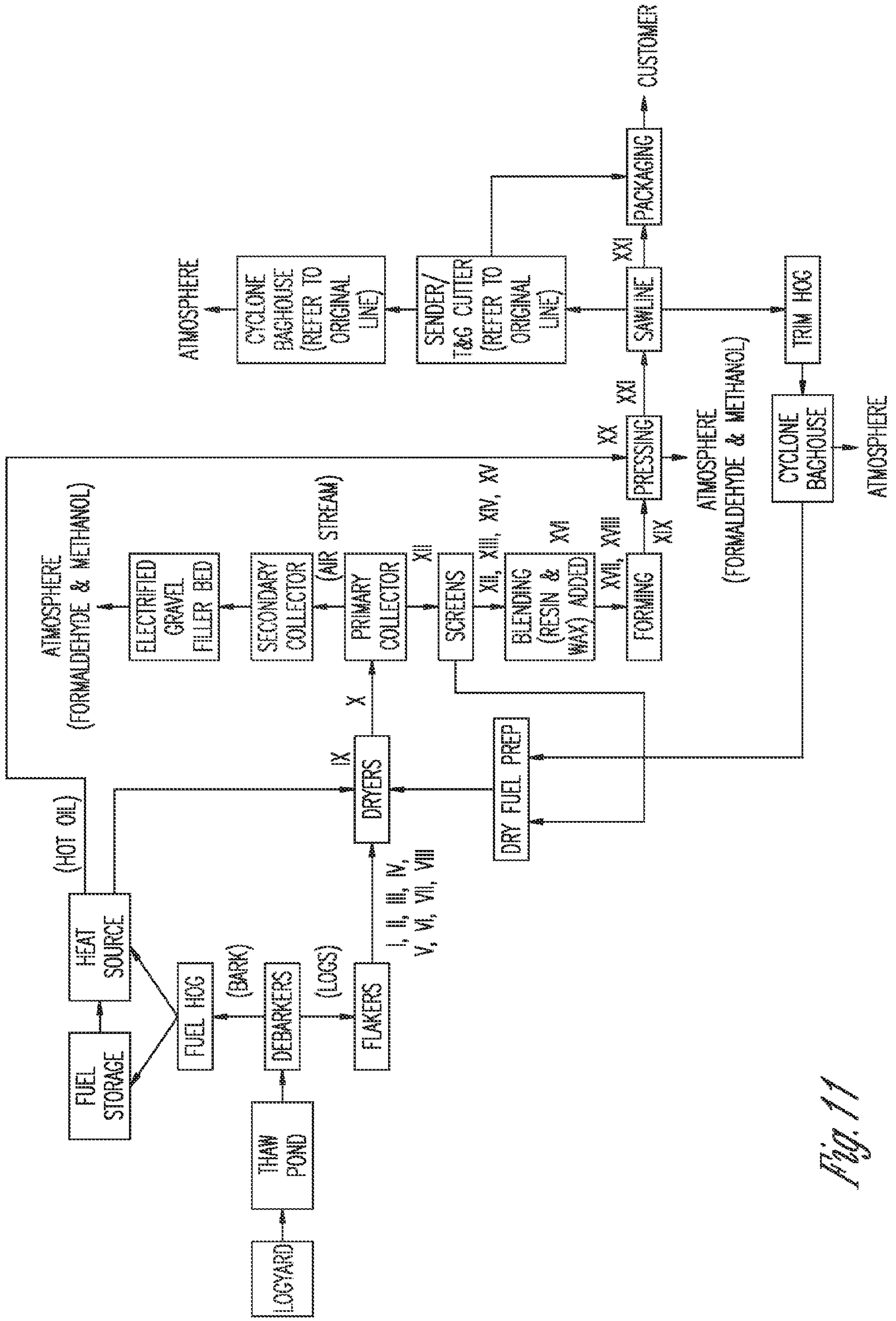
FIG. 11 illustrates a process flow of a panel of the present invention, wherein suitable locations and methods in which the resin can be introduced and applied (e.g., to the flakes) are shown in Roman numerals, which correspond to Tables I-II.
Figure 12:
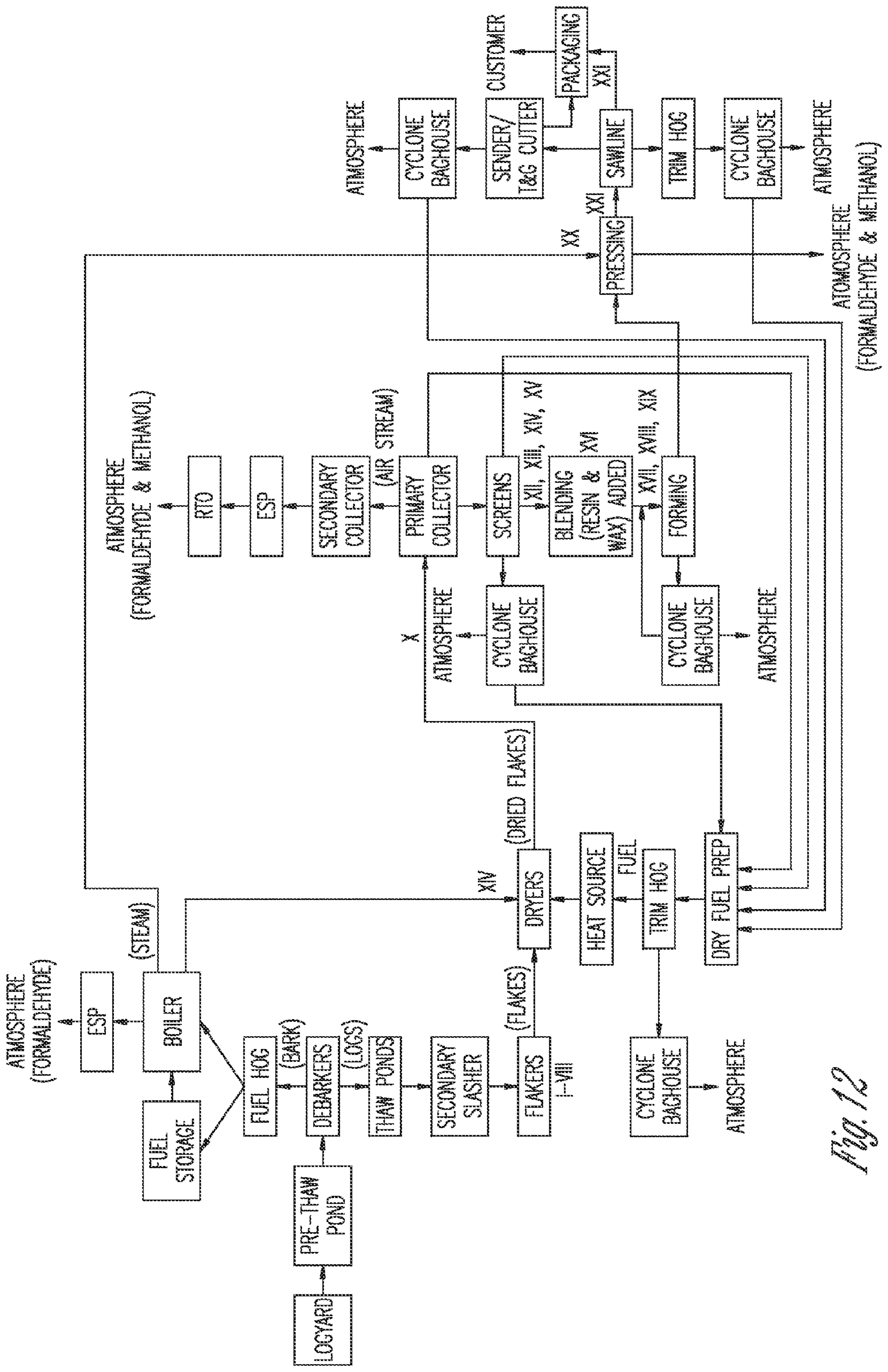
FIG. 12 illustrates a process flow of a panel of the present invention, wherein suitable locations and methods in which the resin can be introduced and applied (e.g., to the flakes) are shown in Roman numerals, which correspond to Tables I-II.

FIG. 10 illustrates a side view of one embodiment that includes two lengths (52) and two widths (50) removed from opposite ends of two side surfaces (28) and opposite ends of the top surface (8) creating two edged planes (60) at opposing ends (70) of the panel (1). A groove (65) is notched from one side surface (28) and two opposing side surfaces (28) at one end (70) of the panel (1) and a tongue (63) protrudes from the entire length of a side surface (28) at another end (70) of the panel (1).

In one embodiment, each of a fire retardant (16), anti-fungal agent (17), pesticide (18), and an anti-mold agent (19) can be present on or in the wood-based composite panel (1) of the present invention.

OSB

An OSB that is not susceptible to top surface edge swell can be manufactured according to the present invention. The process includes: (i) contacting flakes (12) of wood with a first resin (5); (ii) orienting, in substantially alternate lengthwise and crosswise layers, the flakes (12) of wood to provide a blanket of substantially oriented flakes; (iii) curing the first resin (5) by exposing the first resin (5) to at least one of an elevated temperature, an elevated pressure, and radiant energy; for a sufficient period of time; to effectively cure the first resin (5); thereby effectively providing a wood-based composite panel (2); and (iv) removing a portion of the panel (2), thereby providing a panel (1) having a non-uniform width such that the width along at least one of the outer sides (20) of the oppositely facing top (8) and bottom surfaces (9) is less than the width of the remaining portions of the panel (1).

Initially, logs pass through a flaker, where they are cut into thin strands (i.e., flakes (12)) of wood. Before the logs pass through a flaker, the logs can optionally be heated, especially if the logs are below about 10° C. (50° F.). The logs can be heated in any suitable manner, provided the physical and chemical integrity of the wood is not compromised. For example, the logs can be heated in a pond of water having a temperature of up to about 80° C. (176° F.), up to about 60° C. (140° F.), or up to about 40° C. (104° F.). Specifically, the logs can be heated in a pond of water having a temperature of about 100° F. (38° C.) to about 110° F. (43° C.). In addition, the logs can be heated for more than about 1 hour. Specifically, the logs can be heated for about 1 hour to about 48 hours. Alternatively, the logs can be heated via microwave for a suitable period of time, effective to dry the logs.

After the logs are cut into thin strands (i.e., flakes) of wood, the flakes (12) can optionally be dried to remove at least some of the water present therein. The flakes (12) can be dried in any suitable manner, provided at least some of the water present therein is removed. For example, the flakes (12) can be dried using a tumble dryer. The flakes (12) can be dried under any suitable conditions (e.g., at a temperature of above about 40° C. (104° F.) for about 10 seconds or more), provided at least some of the water present therein is removed. Specifically, the flakes (12) can be dried at about 180° F. to about 300° F. for about 8 minutes to about 10 minutes.

Upon exposure to the elevated temperature, elevated pressure, and/or radiant energy, the first resin (5) will cure, thereby adhering the flakes (12) of wood to one another.

Plywood

A plywood that is not susceptible to top surface edge swell can be manufactured according to the present invention. The process includes: (i) contacting veneers of wood (13) with a first resin (5); (ii) orienting, in alternating lengthwise and crosswise layers, the veneers of wood (13) to provide a stack of alternating oriented veneers (13); (iii) curing the first resin (5) by exposing the first resin (5) to at least one of an elevated temperature, an elevated pressure, and radiant energy; for a sufficient period of time; to effectively cure the first resin (5); thereby effectively providing a wood-based composite panel (2); and (iv) removing a portion of the panel (2), thereby providing a panel (1) having a non-uniform width such that the width along at least one of the outer sides of the oppositely facing top and bottom surfaces is less than the width of the remaining portions of the panel (1).

Initially, the logs are debarked and then placed in a hot water vault for about 8 to about 24 hours. The logs are then placed in a lathe, where a spindle knife cuts the logs into veneers (13) of wood. The veneers (13) are clipped in pieces about 8 feet or less in width. The clipped pieces are manually sorted into face sheets, filler sheets, and core sheets. These green veneers (13) are optionally stored or directly placed into a dryer for a suitable period of time to remove at least some of the water present therein. The dried veneers (13) are either stored or used directly in the mill. The dried veneers (13) are contacted with a first resin (5) and then oriented in alternate lengthwise and crosswise layers on a sheet or screen to form a stack of oriented veneers (13) of wood. The stack of oriented veneers (13) can be pressed (e.g., heated under pressure to compress the stack to a suitable width) and a portion of the panel (2) can be removed, thereby providing a panel (1) having a non-uniform width such that the width along at least one of the outer sides (20) of the oppositely facing top (8) and bottom surfaces (9) is less than the width of the remaining portions of the panel (1).

Species of Timber

Any suitable species of timber (i.e., wood) can be employed to make the wood-based composite panel. In addition, the wood-based composite panel can be manufactured from one or more suitable species of timber. Suitable types of timber include, e.g., Western, Northern (and Appalachian), and Southern timber.

Suitable Western timbers include, e.g., Incense-Cedar, Port-Orford-Cedar, Douglas Fir, White Fir, Western Hemlock, Western Larch, Lodgepole Pine, Ponderosa Pine, Sugar Pine, Western White Pine, Western Redcedar, Redwood, Engelmann Spruce, Sitka Spruce, Yellow-Cedar, Red Alder, Oregon Ash, Aspen, Black Cottonwood, California Black Oak, Oregon White Oak, Big Leaf Maple, Paper Birch, and Tanoak.

Suitable Northern (and Appalachian) timbers include, e.g., Northern White Cedar, Balsam Fir, Eastern Hemlock, Fraser Fir, Jack Pine, Red Pine, Eastern White Pine, Eastern Red Cedar, Eastern Spruce, Tamarack, Ash, Aspen, Basswood, Buckeye, Butternut, American Beech, Birch, Black Cherry, American Chestnut, Cottonwood, Elm, Hack Berry, True Hickory, Honey Locust, Black Locust, Hard maple, Soft Maple, Red Oak, White Oak, American Sycamore, Black Walnut, and Yellow-Poplar.

Suitable Southern timbers include, e.g., Atlantic White Cedar, Bald Cypress, Fraser Fir, Southern Pine, Eastern Red Cedar, Ash, Basswood, Arnecan, Beech, Butternut, Cottonwood, Elm, Hackberry, Pecan Hickory, True Hickory, Honey Locust, Black Locust, Magnolia, Soft Maple, Red Oaks, Sassafras, Sweetgum, American Sycamore, Tupelo, Black Walnut, Black Willow, and Yellow Poplar.

First Resins

As described herein, the flakes (12) or veneers (13) are contacted with a first resin (5). The flakes (12) or veneer are subsequently cured to mechanically and chemically bind the first resin (5) to the flakes (12) or veneers (13). Such curing can typically be accomplished by exposing the first resin (5) and flakes (12) or the first resin (5) and veneers (13) to elevated temperatures, elevated pressures, and/or radiant energy (e.g., UV, electron beam, microwave, beta radiation, gamma radiation, neutron beam, proton beam, infra red, etc.) for a sufficient period of time to effectively cure the first resin (5). The first resin (5) can optionally include a catalyst.

Upon curing, the first resin (5) can impregnate the flakes (12) or the veneers (13), or the first resin (5) can remain on the outer surface of the flakes (12) or the veneers (13). The curing provides an OSB or plywood wherein the first resin (5) is mechanically and chemically bound to the flakes (12) or the veneers (13). The chemical bonding results in the formation of chemical linkages between the first resin (5) and the cellulose and hemicellulose in the flakes (12) or the veneers (13). Such curing of the first resin (5), therefore, effectively provides for the underlying wood-based substrate.

The first resin (5) (i.e., adhesive polymer) can either be a thermoplastic polymer or a thermosetting polymer. Thermoplastic polymers are long-chain polymers that soften and flow on heating, then harden again by cooling. They generally have less resistance to heat, moisture, and long-term static loading than do thermosetting polymers. Common wood adhesives that are based on thermoplastic polymers include, e.g., polyvinyl acetate emulsions, elastomerics, contacts, and hot-melts. Alternatively, thermosetting polymers undergo irreversible chemical change, and on reheating, they do not soften and flow again. They form cross-linked polymers that have strength, have resistance to moisture and other chemicals, and are rigid enough to support high, long-term static loads without deforming. Suitable first resins (5) that are based on thermosetting polymers include, e.g., phenolic, resorcinolic, melamine, isocyanate, urea, an epoxy resin, a phenol-formaldehyde (PF) resin, a melamine-formaldehyde (MF) resin, a phenol-melamine-formaldehyde (PMF) resin, and combinations thereof.

The suitable first resin (5) can be of natural origin, can be of synthetic origin, or can include first resins (5) of a combination thereof. Suitable resins of natural origin include, e.g., animal protein, blood protein, casein protein, soybean protein, lignocellulostic residue and extracts, bark-based resins, and combinations thereof. Suitable resins of synthetic origin include, e.g., cross-linkable polyvinyl acetate emulsion, elastomeric contact, elastomeric mastic, emulsion polymer/isocyanate, epoxy, hot melt, isocyanate, formaldehyde, melamine and melamine urea, phenolic, polyvinyl acetate emulsion, polyurethane, resorcinol and phenol resorcinol, urea, and combinations thereof. In one embodiment of the present invention, the first resin (5) can be a foaming adhesive, such as dry cow blood.

Specifically, the first resin (5) can include an isocyanate resin, a melamine resin, a phenol-formaldehyde (PF) resin, a melamine-formaldehyde (MF) resin, a phenol-melamine-formaldehyde (PMF) resin, a melamine-urea-formaldehyde (MUF) resin, a phenol-melamine-urea-formaldehyde (PMUF) resin, or a combination thereof. More specifically, the first resin (5) can be a melamine resin, e.g., phenol-melamine-formaldehyde (PMF) resin which is commercially available from ARC Resins Corporation (Longueuil, Quebec, Canada), Borden Chemical Inc. (Columbus, Ohio), GP Resin (Atlanta, Ga.) or Dynea (Austria). PMF Resin is a phenol-melamine-formaldehyde copolymer.

Any suitable isocyanate can be employed as the first resin (5). Suitable isocyanates include, e.g., PMDI (polymethylenedipenyl-4,4'-diisocyanate); MDI (methylene diphenyl diisocyanate), or a combination thereof. Additional suitable isocayantes are disclosed, e.g., in Aldrich Catalogue (Milwaukee, Wis.).

The phenol can optionally be substituted. Suitable substituted phenols include, e.g., alkyl substituted phenols, aryl substituted phenols, cycloalkyl substituted phenols, alkenyl substituted phenols, alkoxy substituted phenols, aryloxy substituted phenols, and halogen substituted phenols, as disclosed in U.S. Pat. No. 5,700,587. Additional suitable substituted phenols are disclosed, e.g., in U.S. Pat. No. 6,132,549.

The formaldehyde can optionally be replaced with another suitable aldehyde. Suitable aldehydes include, e.g., formaldehyde, acetaldehyde, propionaldehyde, furfuraldehyde and benzaldehyde. In general, the aldehyde employed can have the formula R'CHO wherein R' is a hydrogen or a hydrocarbon radical of 1 to about 12 carbon atoms. Specifically, the aldehyde can be formaldehyde. Suitable additional aldehydes are disclosed, e.g., in U.S. Pat. No. 5,700,587 and Aldrich Catalogue (Milwaukee, Wis.).

The first resin (5) can be a solid (e.g., powder) or a liquid. When the first resin (5) is a liquid, the liquid resin can be relatively viscous or relatively non-viscous. When the first resin (5) is a liquid and is relatively viscous, the first resin (5) can optionally be diluted with one or more carriers to render the first resin (5) relatively non-viscous. Suitable carriers include, e.g., water, organic hydrocarbons, or a combination thereof.

Additional suitable first resins (5) can be found, e.g., in the *Handbook of Thermoset Plastics; Wood Handbook*, sections 9-16, 9-9, 10-3, and 10-4*; Forest Products Society Publications* (http://www.forestprod.org); *Wood Adhesives* 2000, extended abstracts cat. No. 7260; *International Contributions to Wood Adhesion Research*, cat. No. 7267*; Wood Adhesives* 1999, cat. No. 7296; 1998 *Resin Binding Seminar Proceedings*, cat. No. 7266; *Handbook of Pressure Sensitive Adhesive Technology*, 3rd Edition by Donatas Satas, Hardcover; *Handbook of Adhesive Technology*, by A. Pizzi, K. L. Mittal, Hardcover; *Resin Transfer Moulding*, by Kevin Potter, Hardcover; and *Cyanoacrylate Resins: The Instant Adhesives*, by Henry L. Lee, Paperback, T/C Press, January 1986; and references cited therein.

Additional suitable first resins (5) can be found, e.g., in U.S. Pat. Nos. 6,136,408; 6,132,549; 4,758,478; 5,700,587; 5,635,118; 5,714,099; 4,364,984; 4,407,999; 4,514,532; 5,425,908; 5,552,095; 5,554,429; 5,861,119; 5,951,795; 5,974,760; 6,028,133; 6,132,885; and references cite therein.

In one specific embodiment of the present invention, the first resin (5) can include a polyolefin (e.g., polyethylene, polypropylene, or a combination thereof), alone or in combination with poly vinylacetate (PVA).

Some suitable first resins (5) are commercially available from, e.g., Borden Chemical Inc. (Columbus, Ohio) and ARC Resins Corporation (Longueuil, Canada).

The first resin (5) can be cured, e.g., under a suitable pressure and temperature for a sufficient period of time effective to cure the first resin (5). The length of time will typically depend upon the desired width of the OSB or the plywood. The length of time can be up to about 1 minute, up to about 2 minutes, up to about 3 minutes, up to about 4 minutes, up to about 5 minutes, or up to about 10 minutes. Typically, the length of time can be about 3.5 minutes to about 7.5 minutes. For example, for ⅜ inch (9.52 mm) OSB, the length of time can be about 230 seconds to about 240 seconds, for 7/16 inch (11.11 mm) OSB, the length of time can be about 230 seconds to about 240 seconds, for 15/32 inch (11.9 mm) OSB, the length of time can be about 260 seconds to about 270 seconds, for ½ inch (12.7 mm) OSB, the length of time can be about 280 seconds to about 290 seconds, for ⅝ inch (15.88 mm) OSB, the length of time can be about 360 seconds to about 370 seconds, and for ¾ inch (19 mm) OSB, the length of time can be about 420 seconds to about 440 seconds.

The first resin (5), upon curing, will preferably impart water-resistance and weather resistance upon the OSB or the plywood. The first resin (5) typically employed, prior to curing, will typically not undergo chemical or physical decomposition, to any appreciable degree, such that the first resin (5) will not cure. Additionally, the first resin (5) typically employed, after curing, will remain stable throughout the subsequent OSB or plywood process step(s).

The first resin (5) may require the presence of a catalyst and/or accelerator to cure the first resin (5). Any suitable catalyst and/or accelerator can be employed, provided the first resin (5) effectively cures in a suitable period of time and the first resin (5), upon curing, remains chemically and physically stable. Suitable catalysts include acid catalysts (e.g., formic acid), base catalysts (e.g., sodium hydroxide, calcium hydroxide, potassium hydroxide, or soda ash), salt catalysts, peroxide catalysts, and sulfur compounds. Additionally, the first resin (5) can optionally include hardeners (e.g., amine hardeners added to epoxy and formaldehyde hardener added to resorcinol) to produce cross-linking reactions to solidify the first resin (5); antioxidants; acid scavengers; preservatives; wetting agents; defoamers; plasticizers; thickeners; and/or colorants. See, e.g., U.S. Pat. Nos. 6,132,549; 5,498,647; 5,700,587; 4,514,532; and 4,758,478.

The first resin (5), prior to or upon curing, can impregnate the flake or the veneer. Specifically, the first resin (5), prior to or upon curing, can completely impregnate the flake or the veneer (i.e., the resin is completely embedded in the flake or the veneer). Alternatively, the first resin (5), prior to or upon curing, can partially impregnate the flake or the veneer. Specifically, the first resin (5), prior to or upon curing, can impregnate up to about 1/100 of the flake, up to about 1/50 of the flake, up to about 1/10 of the flake or the veneer, up to about ¼ of the flake or the veneer, up to about ½ of the flake or the veneer, up to about ¾ of the flake or the veneer, or up to about 99/100 of the flake or the veneer. More specifically, the first resin (5), prior to or upon curing, can impregnate about 1/20 to about ½ of the flake or the veneer.

Step(s) in which First Resin can be Added to Flakes

As disclosed in Tables I and II and FIGS. 1-2, the flakes (12) of wood can be contacted with the first resin (5) at any suitable step to provide a treated oriented strand board (1), provided: the first resin (5) effectively cures during the pressing of the blanket of oriented flakes (12); and the resin retains its adhesiveness over the extended periods of time typically encountered with the lifespan of the treated oriented strand board (1). The lifespan can be, e.g., to about 10 years, up to about 25 years, up to about 50 years, or up to about 100 years).

Specifically, the flakes (12) of wood can be contacted with the first resin (5) after the flakes (12) of wood are dried and before the flakes (12) of wood are pressed.

Specifically, as disclosed in Tables I and II and FIGS. 1-2, the flakes (12) of wood can be contacted with the first resin (5) at a flaker outfeed, on a flake conveyor belt, at a drop-out to green bins (pantlegs), at an entry to green bins, on the inside of a green bins, at a green bin outfeed (drop chute), at a screw auger pan to dryer, at a airlock separation, at a dryer infeed, at a 1$^{st}$ pass of 3 pass dryer, at a dryer outfeed, at a primary cyclone, at an airlock separation, at a reversing conveyor to dry bin or fire dump or conveyor to screens, at an inside dry bins, at a dry bin conveyor, at a scales, on a conveyor, inside a blender, at a forming line heads, at a forming line, at a caul plate or screen, at a steam injection in press, or any combination thereof.

Specifically, as disclosed in Tables I and II and FIGS. 1-2, the flakes (12) of wood can be contacted with the first resin (5) inside the blender.

Method(s) to Apply the First Resin to Flakes

The first resin (5) can be applied to the flakes (12) in any suitable manner, provided: the first resin (5) effectively cures during the pressing of oriented flakes (12) (i.e., pressing stage); and the first resin (5) retains its adhesiveness over the extended periods of time typically encountered with the lifespan of the treated oriented strand board (1). The lifespan can be, e.g., up to about 25 years, up to about 50 years, or up to about 100 years.

Specifically, Tables I-II and FIGS. 1-2 illustrate suitable methods in which the flakes (12) can be contacted with the first resin (5). These suitable methods include, e.g., spraying, rolling, laminating, pressure injecting, dipping, and/or injecting the flakes (12) with the first resin (5). Specifically, the flakes (12) can be contacted with the first resin (5) by spraying the flakes (12) with the first resin (5).

Specifically, the flake of wood can be contacted with the first resin (5) by spraying the first resin (5) onto the flakes (12) of wood. More specifically, the flake of wood can be contacted with the first resin (5) by dry spraying the powdered first resin (5) onto the flakes (12) of wood.

The following table illustrates possible locations and methods in which the first resin (5) can be introduced and applied to the flakes (12) of wood, wherein the locations are shown in the accompanying figures herein below.

TABLE I

| Id. | Materials Handling Process-Generic | Application Location | Comments |
|---|---|---|---|
| I. | Flaker to Convey system | Flaker Outfeed | |
| II. | Convey to Green Bins | Flake Conveyor belt | |
| III. | Convey to Green Bins | Drop-out to Green Bins (Pantlegs) | |
| IV. | Convey to Green Bins | Entry to Green Bins | |
| V. | Green Bin | Inside Green Bins | Head end before doffing rolls |
| VI. | Green Bin to Dryer | Green Bin Outfeed (drop chute) | |
| VII. | Green Bin to Dryer | Screw auger pan to dryer | |
| | Airlock Separation | Airlock Separation | Flakes are clumped and compressed |
| VIII. | Convey to Dryer | Dryer infeed | |
| IX. | Inside Dryer | 1$^{st}$ Pass of 3 pass dryer | Could also be inside conveyor dryer |
| X. | Convey to Product Separator (Primary Cyclone) | Dryer Outfeed | Nozzles in dryer outfeed |
| XI. | Product Separator Airlock Separation | Primary Cyclone Airlock Separation | |
| XII. | Convey to Screens and Dry Bins | Reversing Conveyor to Dry Bin or Fire Dump or Conveyor to Screens | |
| XIII. | Dry Bin | Inside Dry Bins | Head end before doffing rolls |
| XIV. | Convey to scales Scales | Dry bin conveyor Scales | |
| XV. | Convey to Blender | On conveyor | Dry Chemical and/or Resin-Together or separately |
| XVI. | Blender | Inside Blender | Dry Chemical, Liquid Resin Liquid Chemical, Liquid Resin Dry Chemical, Dry Resin Liquid Chemical, Dry Resin |
| XVII. | Forming Heads | Forming Line Heads | Applying in forming head bins |
| XVIII. | Forming | Forming Line | Spray on dry flake mat |

The following table illustrates additional possible locations and methods in which the first resin (5) can be introduced and applied to the flakes (12) of wood. The locations are shown in the accompanying figures herein below.

TABLE II

| Id. | Materials Handling Process-Generic | Application Location | Comments |
|---|---|---|---|
| XIX. | Convey | New Option: Pneumatic Conveyor | From Flaker to Green Bin-spray nozzles in pneumatic pipe |
| XX. | Green Flake Blender | Somewhere between 1 and 5, or at 6 and 7, or 8 | Could be off-line operation, or integrated into line |
| XXI. | Pre-dry (flake) Operation | After flaker, re-introduce to Green Bin or Dryer | Could be off-line operation or integrated into line |
| XXII. | Pre-Dry (flake) Operation | New Equip Options: Radio Frequency Microwave Rotary Dryer Conveyor Dryer Fluidized Bed Low Headspace Drying | |
| XXIII. | Pre-Dry or Dry | Conventional Line drying Options: Rotary Triple Pass Conveyor New Equipment: Single Pass Dryer Single Pass combination Blender/Dryer | |
| XXIV. | Pre-Compression | Pre-compression roller | |
| XXV. | Separate Operation | On Conventional OSB | Similar to conventional post-production treating Spray Spread Dip Pressure Treat (Retort) Pressure Inject Laminate |

Step(s) in which First Resin can be Added to Veneers

The veneers (13) of wood can be contacted with the first resin (5) at any suitable step to provide an plywood (1), provided: the first resin (5) effectively cures during the pressing of the stack of veneers (13); and the first resin (5) retains its adhesiveness over the extended periods of time typically encountered with the lifespan of the plywood (1). The lifespan can be, e.g., up to about 25 years, up to about 50 years, or up to about 100 years.

Specifically, the veneers (13) of wood can be contacted with the first resin (5) after the veneers (13) of wood are dried and before the stack of veneers (13) of wood are pressed.

Method(s) to Apply First Resin to Veneers

The first resin (5) can be applied to the veneers (13) in any suitable manner, provided: the first resin (5) effectively cures during the pressing of stack of veneers (13) (i.e., pressing stage); and the first resin (5) retains its adhesiveness over the extended periods of time typically encountered with the lifespan of the plywood (1). The lifespan can be, e.g., up to about 25 years, up to about 50 years, or up to about 100 years.

Suitable methods in which the veneers (13) can be contacted with the first resin (5) include, e.g., spraying, rolling, laminating, pressure injecting, dipping, curtain coating, foam application, and/or injecting the veneers (13) with the first resin (5). Specifically, the veneers (13) can be contacted with the first resin (5) by spraying the veneers (13) with the first resin (5).

Specifically, the veneers (13) of wood can be contacted with the first resin (5) by spraying the first resin (5) onto the veneers (13) of wood. More specifically, the veneers (13) of wood can be contacted with the first resin (5) by dry spraying the powdered first resin (5) onto the veneers (13) of wood.

All publications, patents, and patent documents cited herein are incorporated by reference herein, as though individually incorporated by reference. The invention has been described with reference to various specific and preferred embodiments and techniques. However, it should be understood that many variations and modifications may be made while remaining within the spirit and scope of the invention.

It is appreciated that certain features of the invention, which are, for clarity, described in the context of separate embodiments, may also be provided in combination in a single embodiment. Conversely, various features of the invention which are for brevity, described in the context of a single embodiment, may also be provided separately or in any sub-combination.

What is claimed is:

1. A wood-based composite panel, comprising:

a top surface having a top perimeter including a first set and a second set of opposing sides;

a bottom surface, opposite the top surface, having a bottom perimeter including a first set and a second set of opposing sides, the first set and the second set of opposing sides of the bottom surface corresponding in relative positioning to the first set and the second set of opposing sides of the top surface; and a first and second set of parallel opposing side surfaces, the side surfaces having a first set and second set of opposing sides, the distance between the first set of opposing sides of the side surfaces corresponding to the distance between the first or second set of opposing sides of the bottom surface;

wherein the distance between at least one of the first set or the second of opposing sides of the top surface is about ⅛ inch to about 4 inch less than the distance between the corresponding first set or second set of opposing sides of the bottom surface, and the distance between the second set of opposing sides of at least two opposing side surfaces is between about 1/1000 inch to about 4/10 inch less than an average distance between the top and bottom surfaces, such that the top surface is not susceptible to edge swell, wherein the distance between the second set of opposing sides of at least the first or second set of opposing side surfaces is less than an average distance between the top and bottom surfaces, wherein the wood-based composite panel is an oriented strand board (OSB) panel.

2. The panel of claim 1, wherein the distance between the second set of opposing sides of two side surfaces is less than an average distance between the top and bottom surfaces.

3. The panel of claim 1, wherein the distance between the second set of opposing sides of at least three side surfaces is less than an average distance between the top and bottom surfaces.

4. The panel of claim 1, wherein the distance between the second set of opposing sides of at least four side surfaces is less than an average distance between the top and bottom surfaces.

5. The panel of claim 1, wherein the panel is configured for tongue and groove fitting on at least one side.

6. The panel of claim 1, wherein the panel is configured for tongue and groove fitting on two sides.

7. The panel of claim 1, wherein the distance between the second set of opposing sides of at least one side surface is about 10/1000 inch to about 3/10 inch less than an average distance between the top and bottom surfaces.

8. The panel of claim 1, wherein the distance between the second set of opposing sides of at least one side surface is at least about 20/1000 inch to about 2/10 inch less than an average distance between the top and bottom surfaces.

9. The panel of claim 1, wherein the distance between the second set of opposing sides of at least one side surface is about 20/1000 inch to about 50/1000 inch less than an average distance between the top and bottom surfaces.

10. The panel of claim 1, wherein the distance between the second set of opposing sides of at least one side surface is about 30/1000 inch to about 40/1000 inch less than an average distance between the top and bottom surfaces.

11. The panel of claim 1, wherein the distance between the second set of opposing sides of at least one side surface is about 35/1000 inch less than an average distance between the top and bottom surfaces.

12. The panel of claim 1 wherein the distance between at least one of the first set or the second set of opposing sides of the top surface is up to about 3.5 inches less than the distance between the corresponding first set or second set of opposing sides of the bottom surface.

13. The panel of claim 1 wherein the distance between at least one of the first set or the second set of opposing sides of the top surface is up to about 3 inch less than the distance between the corresponding first set or second set of opposing sides of the bottom surface.

14. The panel of claim 1 wherein the distance between at least one of the first set or the second set of opposing sides of the top surface is more than about 1/16 inch less than the distance between the corresponding first set or second set of opposing sides of the bottom surface.

15. The panel of claim 1 wherein the distance between at least one of the first set or the second set of opposing sides of the top surface is more than about 1/8 inch less than the distance between the corresponding first set or second set of opposing sides of the bottom surface.

16. The panel of claim 1 wherein the distance between at least one of the first set or the second set of opposing sides of the top surface is more than about 3/8 inch less than the distance between the corresponding first set or second set of opposing sides of the bottom surface.

17. The panel of claim 1 wherein the distance between at least one of the first set or the second set of opposing sides of the top surface is about 4/10 inch to about 1 inch less than the distance between the corresponding first set or second set of opposing sides of the bottom surface.

18. The panel of claim 1 wherein the distance between at least one of the first set or the second set of opposing sides of the top surface is about 6/10 inch to about 8/10 inch less than the distance between the corresponding first set or second set of opposing sides of the bottom surface.

19. The panel of claim 1 wherein the distance between at least one of the first set or the second set of opposing sides of the top surface is about 7/10 inch less than the distance between the corresponding first set or second set of opposing sides of the bottom surface.

20. A wood-based composite panel, comprising:

a top surface having a top perimeter including a first set and a second set of opposing sides;

a bottom surface, opposite the top surface, having a bottom perimeter including a first set and a second set of opposing sides, the first set and the second set of opposing sides of the bottom surface corresponding in relative positioning to the first set and the second set of opposing sides of the top surface; and a first and second set of parallel opposing side surfaces, the side surfaces having a first set and second set of opposing sides, the distance between of the first set of opposing sides of the side surfaces corresponding to the distance between the first or second set of opposing sides of the bottom surface, wherein the distance between the second set of opposing sides of at least one side surface is at least about 1/10 inch to about 4/10 inch less than an average distance between the top and bottom surfaces;

wherein the distance between at least one of the first set or the second set of opposing sides of the top surface is about 1/8 inch to about 4 inch less than the distance between the corresponding first set or second set of opposing sides of the bottom surface, such that the top surface is not susceptible to edge swell, wherein the distance between the second set of opposing sides of at least four side surfaces is less than an average distance between the top and bottom surfaces, wherein the wood-based composite panel is an oriented strand board (OSB) panel.

* * * * *